Nov. 1, 1960 F. W. ROSS 2,958,484
ELECTRICAL AERODYNAMIC AIRCRAFT CONTROL SYSTEM
Filed July 29, 1957 6 Sheets-Sheet 2
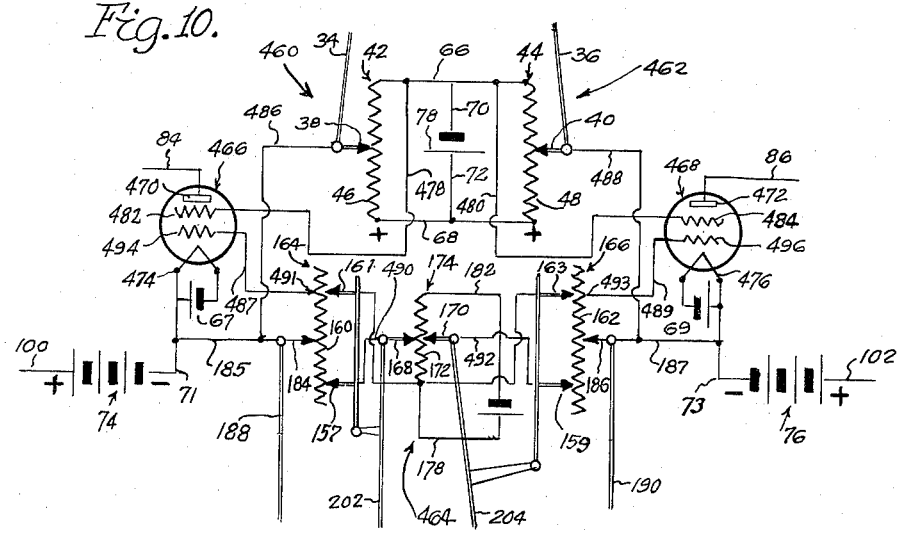
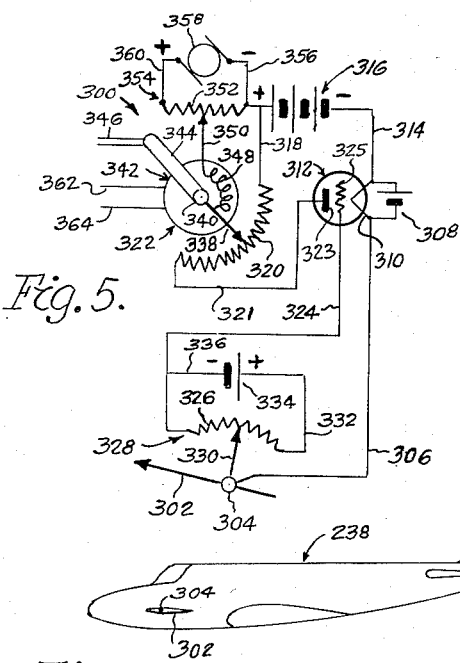
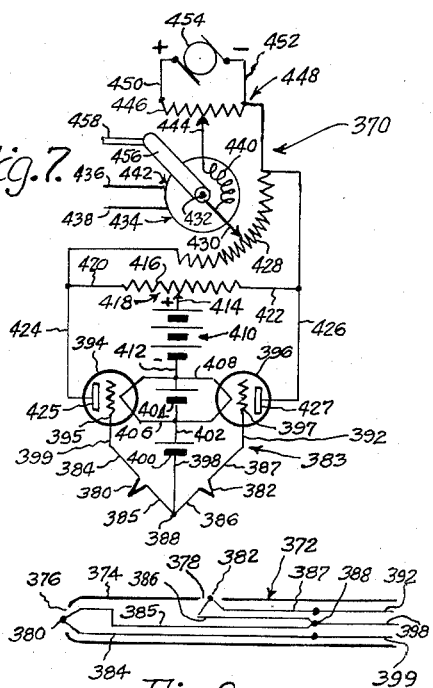
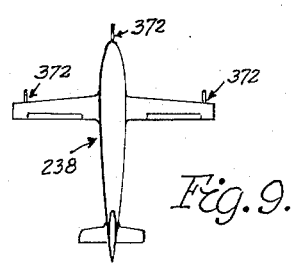
INVENTOR.
Frederick W. Ross
BY Barthel + Bugbee
Attys INVENTOR.
Frederick W. Ross
BY Barthel + Bugbee
Attys Nov. 1, 1960  F. W. ROSS  2,958,484
ELECTRICAL AERODYNAMIC AIRCRAFT CONTROL SYSTEM
Filed July 29, 1957  6 Sheets-Sheet 4
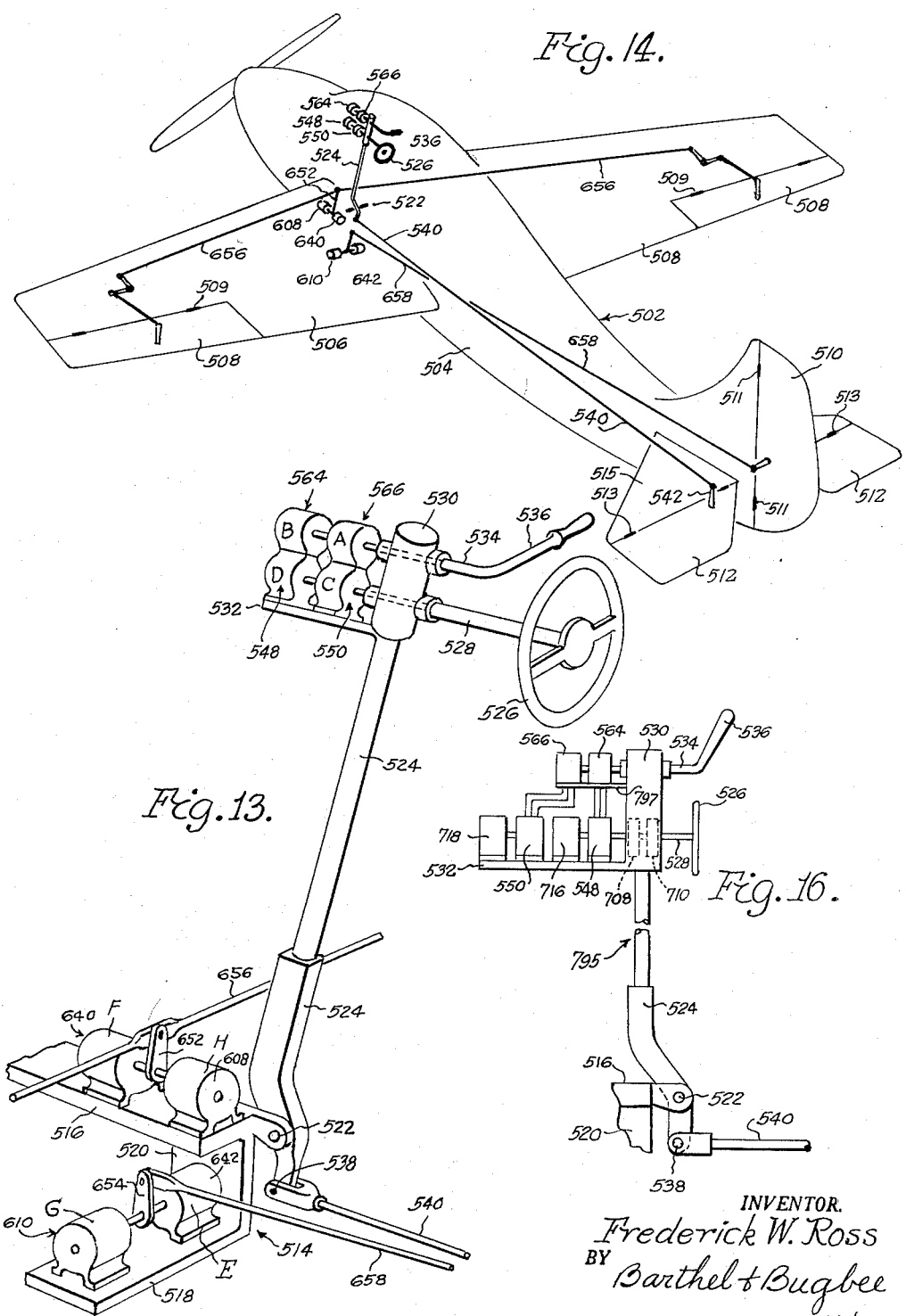
INVENTOR.
Frederick W. Ross
BY Barthel & Bugbee
Attys

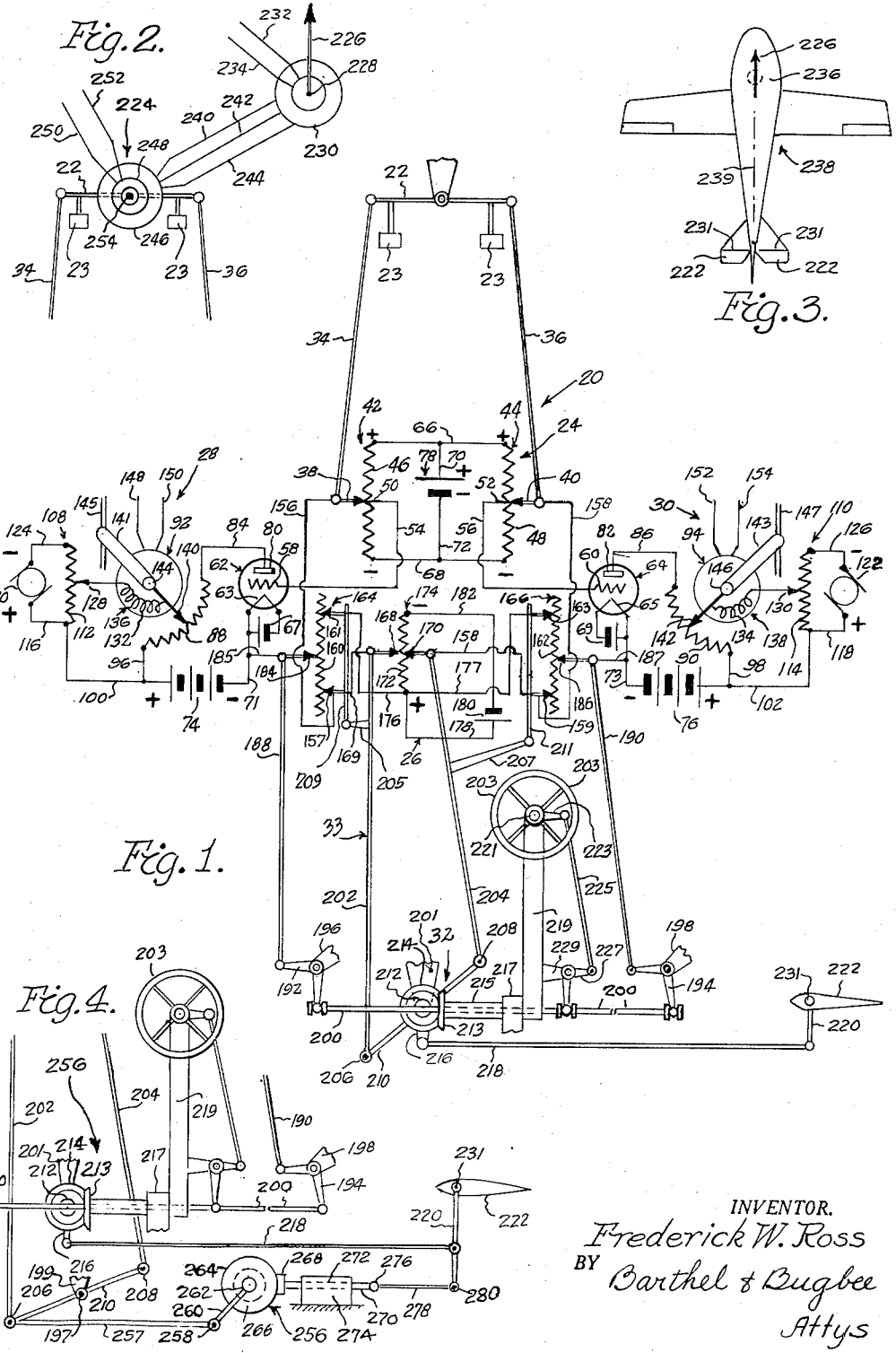

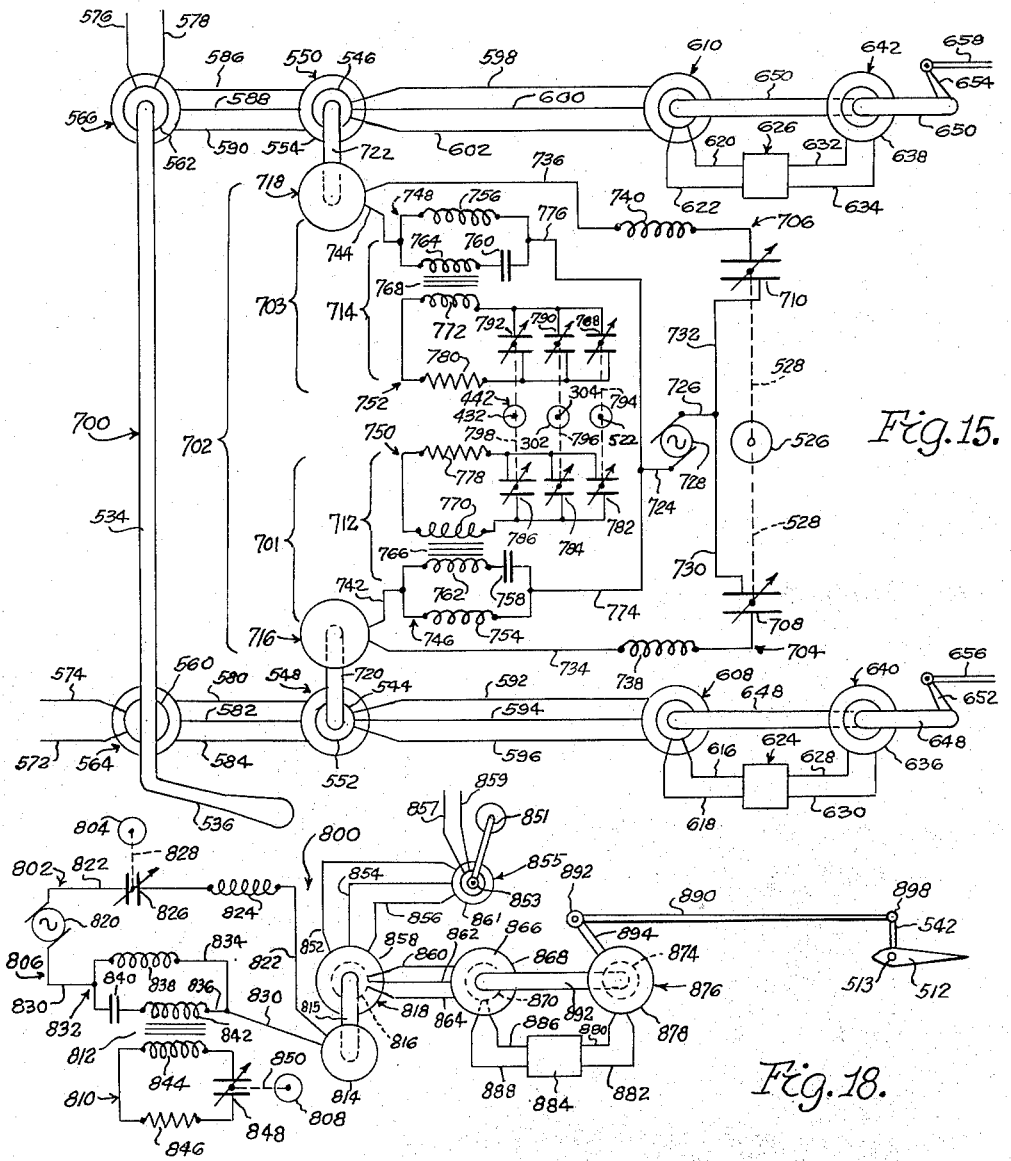

United States Patent Office 2,958,484
Patented Nov. 1, 1960

2,958,484

ELECTRICAL AERODYNAMIC AIRCRAFT CONTROL SYSTEM

Frederick W. Ross, 719 N. Melborn, Dearborn, Mich.

Filed July 29, 1957, Ser. No. 674,724

21 Claims. (Cl. 244—77)

This invention relates to aircraft and, in particular, to aerodynamic aircraft control systems equipped with roll, yaw and pitch control devices.

A modern aircraft, particularly an airplane, in order to be maneuvered both while flying and during takeoff and landing, is equipped with three principal control devices including three different control elements known to aircraft engineers respectively as a roll control element, such as an aileron, to control the roll angle of the airplane, a yaw control element, such as a rudder, to control the yaw angle of the airplane, and a pitch control element, such as an elevator, to control the pitch angle or angle of attack of the airplane with respect to the oncoming air. Such devices are known collectively in the aircraft art as aerodynamic controls, and when used in conjunction with the engine controls, provide means for guiding the aircraft through all of its maneuvers.

Hitherto, in maneuvering an airplane, the above-mentioned roll, yaw and pitch control elements have been independent of one another and independently controlled by the pilot, with the result that, in conjunction with the engine controls, it has been necessary for the pilot to coordinate properly the amount of control and the time of application of each control element during each instant of the maneuver being carried out. In particular, to perform a properly coordinated banked turn, the operator has been required to coordinate operation of the roll control simultaneously with his operation of the yaw control. This proper coordination of these two controls has required long training as well as considerable skill and continued practice on the part of the pilot and the necessity of coordinating such independent controls correctly has been difficult to master and when carried out improperly has been a source of danger to both the pilot and the aircraft where the pilot has failed to coordinate the controls properly at a time when the dangers of a stall and a spin are imminent.

Hitherto, also, under conventional systems of control in making a turn, for example, to the right, the operator of an airplane rotates his control wheel to the right to "bank" the airplane with the right aileron up and the left aileron down, causing the right wing to move downward and the left wing to move upward. This aileron action, however, imparts an adverse yaw effect to the airplane, tending to turn the nose of the airplane to the left, away from the desired direction of turn imparted by the aileron. In addition, there is set up a similar adverse yawing tendency of the wing, induced by its angular velocity in roll of the airplane.

To counteract these adverse yawing tendencies, the operator applies rudder action. In addition, he must also apply rudder action sufficient to provide the necessary change in yawing velocity which is characteristic of the rate of turning. The pilot does this by trial and error, first applying a trial amount of rudder, watches the result to determine whether or not the applied amount of rudder has been insufficient, over-sufficient or sufficient. If the amount of rudder applied has not been sufficient, he thereafter applies alternate corrective action with both rudder and ailerons until the adverse yaw effect has been overcome and the turn has been properly executed.

If the amount of rudder applied has not been sufficient, he thereafter applies alternate corrective action with both rudder and ailerons until the adverse yaw effect has been overcome and the turn has been properly executed. In private airplanes and larger conventional aircraft, such as air transport and bomber planes, the ailerons are usually controlled by a wheel rotatably mounted on the so-called control stick which is movable back and forth in a fore-and-aft direction to control the elevators, the rudder being controlled by foot pedals. In military fighter aircraft, the control wheel is replaced by a lateral swinging action of the control stick, for greater rapidity of maneuvering.

Moreover, where a pilot has heretofore wished to perform a side-slipping maneuver and for cross wind landings, it has been necessary for him to operate his roll control in a reverse manner with respect to the yaw control from that required for the ordinary coordination. Because this maneuver of side slipping into an airport or making a cross wind landing thereon has to be performed at low altitude, the consequences of improper so-called cross-control operation are extremely serious. Prior attempts to provide coordinated control between the previously independent mechanical control systems have variously included a coupling between the roll control elements and the yaw control elements, or solely a roll control element without any yaw control element, or a coupling between the roll control element and the yaw control element including an overriding mechanism on the yaw control element, such as the rudder. These previous systems have either limited the control operation, with a resulting increase in the danger of flying, or have required a different coordination of controls by the pilot involving the same or greater complexity than that required in manually-coordinating the conventional mechanically independent control system.

The present inventor, in an effort to simplify the carrying out of coordinated controls and consequently to reduce the skill required of the pilot, reduce the time required to teach the pilot, reduce the dangers of piloting an airplane, and improve the speed and precision with which he can actuate the controls, has hitherto provided mechanically-actuated aerodynamic aircraft control systems by which such coordination is carried out automatically yet which enables the pilot, where he desires, to override this automatic coordination and carry out manual control, such as cross control operation for side slipping and for cross-wind landing. These systems have been disclosed and claimed in his previous Patents Nos. 2,542,946 of February 20, 1951, for Airplane Control System, 2,705,-117 of March 29, 1955, for Airplane Control System, and 2,781,182 of February 12, 1957, for Aerodynamic Aircraft Control System. These prior inventions of the present inventor have provided aerodynamic control systems containing means for automatically coordinating roll control with yaw control, together with an overriding cross control or side slip control, thereby providing simpler operational procedures on the part of the pilot with consequently improved performance and safety. These prior aircraft control systems of the present inventor, however, have been purely mechanical in that they employed purely mechanical elements and mechanisms.

In recently-developed high speed aircraft, especially jet-propelled military and commercial transport aircraft, the demands made on purely mechanically-actuated control systems have been excessive both as to the strength of the various components, as to the physical force required to be exerted by the pilot to operate them and as to the greater speed of response needed in their operation. This is especially true with regard to the very large and heavy high speed aircraft, such as jet-propelled fighter and bomber planes and jet-propelled civilian transport aircraft. In order to fulfill the demands made upon the pilot and the control system in such a plane, the present inventor has devised electrical aerodynamic aircraft control systems wherein the regulation of the system is performed largely by electrical means, including electronic means, with a resulting higher speed of response, less physical force required on the part of the operator, and a great reduction in the weight and complexity of the mechanical parts otherwise required in a purely mechanical system.

Accordingly, one object of the present invention is to provide an electrical aerodynamic control system for an aircraft wherein electrical means is provided for automatically coordinating the roll control with the yaw control for correctly executing a properly coordinated turn, thereby eliminating many of the weaknesses of purely mechanical aerodynamic control systems, particularly when installed in large and/or high speed aircraft.

Another object is to provide an electrical aerodynamic aircraft control system of the foregoing character wherein electrical means is also provided for overriding the coordination so as to operate the roll control in a reverse manner relatively to the yaw control by the application of so-called cross-controls.

Another object is to provide an electrical aerodynamic control system of the foregoing character wherein the coordination is automatically varied in accordance with the variation in the angle of attack of the aircraft or in the speed of the aircraft at extremely high speeds according to the so-called Mach number, wherein the speed of the aircraft is expressed in terms relatively to the speed of sound.

Another object is to provide an electrical aerodynamic control system of the foregoing character which includes electronic tube components or their transistor equivalents in the system and alternatively or additionally includes electrically-actuated servo mechanisms.

Another object is to provide a modified electrical aerodynamic control system of the foregoing character wherein all rubbing or sliding mechanical contacts of potentiometers and the like are eliminated and their consequent defects avoided by making use of alternating current resonance circuits, taking advantage of varying their resonance to accomplish rotation of the rotors of two differential synchro-generators operating the roll and yaw control elements respectively of the aircraft in proportion to the deflections of control condensers by a manual control member as altered by the automatic variation of the settings of one or more adjuster controls, such as variable adjuster condensers disposed in the resonance circuits, in response to variations in auxiliary effects such as elevator or pitch element position, Mach meter indicator and/or angle of attack indicator.

Another object is to provide a further modified electrical aerodynamic aircraft control system also making use of an alternating current resonance circuit, the resonance characteristics of which are altered automatically by electrical adjusters, such as variable adjuster condensers disposed in the resonance circuits, the settings of the adjusters being varied in response to the variation of either a yaw rate indicator or a roll rate indicator (such as a roll rate gyro) or both, in order to vary the positioning of the pitch control element or elevator of the aircraft.

Another object is to provide a still further modification of the electrical aerodynamic aircraft control system set forth in the object immediately preceding wherein the setting of the pitch control element or elevator of the aircraft is in part additionally determined and controlled by the operation of an additional alternating current circuit containing one or more adjusters, such as variable condensers, with the output of the circuit operating a device similar in principle to an alternating current ammeter, the mechanical fluctuations of which are transmitted to a differential synchro-generator interposed in the circuit of the system set forth in the object immediately preceding, the setting of one adjuster being varied in response to the variation of an angle of roll (or bank) indicator or of a rate of turn indicator while the setting of the other adjuster is varied in response to the operator's adjustment of the manual pitch control member.

Other objects and advantages of the invention will become apparent during the course of the following description of the accompanying drawings, wherein:

Figure 1 is a diagrammatic view of an electrical aerodynamic aircraft control system including a resistance-coupled electrical circuit;

Figure 2 is a fragmentary view of a modification of the uppermost portion of Figure 1, wherein electrical means is additionally provided for actuating the control system in accordance with the direction of a yaw indicator mounted on the aircraft;

Figure 3 is a diagrammatic top plan view, upon a reduced scale, showing one position of the yaw indicator and synchro-generator employed in the system of Figure 2;

Figure 4 is a fragmentary view of a modification of the lowermost portion of Figure 1, wherein an additional servo-motor is provided for a variable control in accordance with the angle of attack circuit shown in Figure 5 or the Mach circuit shown in Figure 7;

Figure 5 is a fragmentary view of the angle-of-attack auxiliary circuit employed in the modification shown in Figure 4;

Figure 6 is a diagrammatic view upon a reduced scale of an aircraft equipped with an angle of attack indicator used in the auxiliary circuit of Figure 5;

Figure 7 is a fragmentary view of a Mach number auxiliary circuit optionally employed in the modification shown in Figure 4;

Figure 8 is a diagrammatic section through a Mach circuit indicator employed in the Mach number auxiliary circuit of Figure 7;

Figure 9 is a diagrammatic top plan view of an aircraft equipped with the Mach-number-responsive auxiliary circuit of Figure 7, showing three possible locations for the Mach circuit indicator of Figure 8;

Figure 10 is a diagrammatic view of the principal part of a modified electrical aerodynamic aircraft control system which differs from the central part of the circuit of Figure 1 in employing multiple grid tubes in the resistance coupling arrangement thereof;

Figure 13 is a perspective view of the manual control device together with the overriding cross control used with the synchronous system of Figures 11 and 12;

Figure 14 is a diagrammatic perspective view, upon a reduced scale, of an aircraft equipped with the modified system shown in Figures 11, 12 and 13, showing the relative locations of the components of the system in the aircraft;

Figure 15 is a schematic diagram of a still further modified aerodynamic aircraft control system employing alternating current resonance circuits to vary the settings of the roll control and pitch control elements of the aircraft, such as ailerons and rudder;

Figure 16 is a side elevation of a manual control unit used in the further modified aerodynamic aircraft control system shown in Figure 15;

Figure 17 is a graphical representation of a family of curves showing the relationship in the circuit of Figure 15 of the variation in current occurring in response to a variation in the ratio of the forced frequency applied to the circuit by the impressed voltage to the natural frequency of the circuit;

Figure 19:
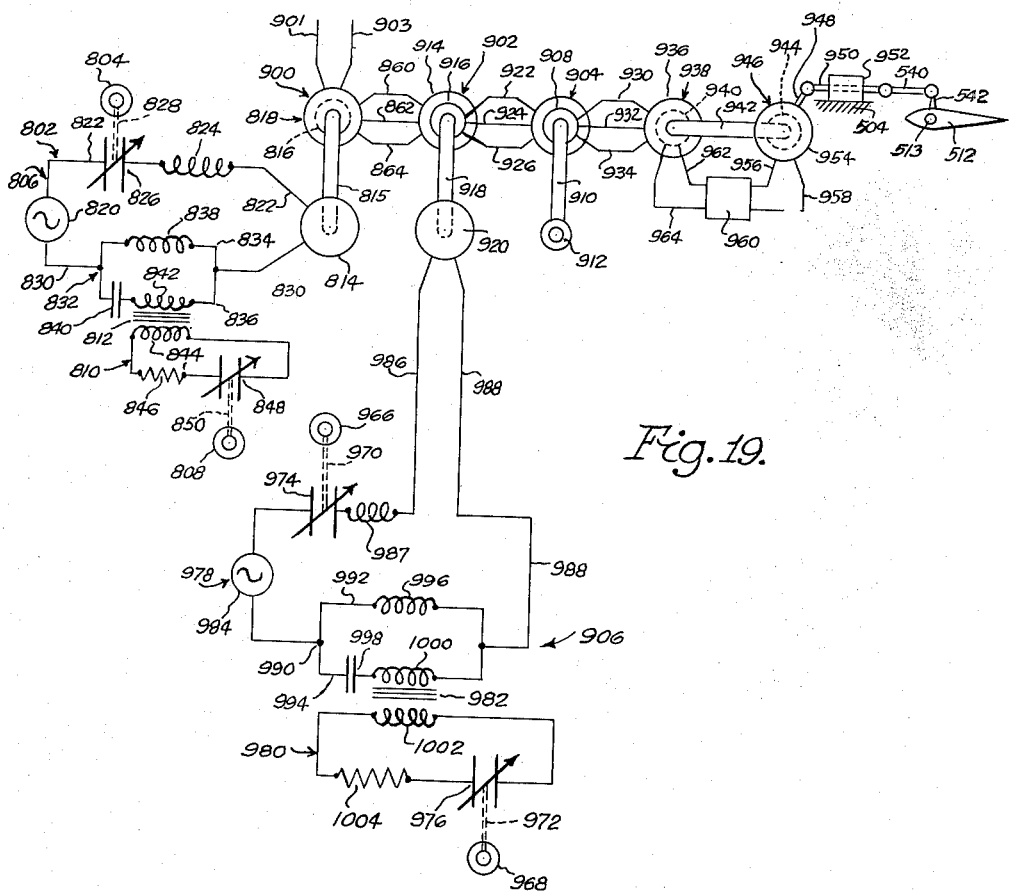

Figure 18 is a schematic diagram of a yet further modified aerodynamic aircraft control system for pitch element or elevator control in response to the variation of resonance in alternating current resonant circuits, the resonances of which are altered in response to variation of the roll rate indicator or gyro and/or the yaw rate indicator or gyro; and Figure 19 is a schematic diagram of an extension of the system of Figure 18 wherein the setting of the pitch element or elevator is additionally determined by the action of an additional circuit controlling an additional differential synchro-generator in response to the variation in the angle of roll (or bank) indicator or rate of turn indicator.

*Resistance-coupled electrical aerodynamic control system*

Referring to the drawings in detail, Figure 1 shows a resistance-coupled electrical aerodynamic aircraft control system, generally designated 20, according to one form of the invention as including a manually-operated cross-control member 22, such as the rudder control bar operated by foot pedals 23, a cross-control subcircuit 24, a variable ratio coordinating subcircuit 26, an aileron or roll element control subcircuit 28, a rudder or yaw element control subcircuit 30, and a pitch-element-responsive or elevator-responsive operator, generally designated 32, for a rudder-aileron ratio varying device or adjuster 33 which consists collectively of the subcircuit 26 and the operator 32 and the adjustable control devices of the subcircuit 26. Here it may be pointed out that in the modification of Figures 2 and 3, the manually-operated cross-control member 22 is replaced in the circuit of Figure 1 by the synchro-operated yaw direction-responsive auxiliary circuit, as described below in connection therewith. It may also be pointed out that in the modification shown in Figure 4, the link of the unit 32 directly connected to the elevator is replaced by a synchro-operated expansible and contractible link, as described below in connection with Figure 4.

In the resistance-coupled circuit 20 of Figure 1, the manual cross-control member 22 is connected by motion-transmitting elements 34 and 36, such as rods, to sliders 38 and 40 respectively of potentiometers 42 and 44 respectively having resistors 46 and 48 respectively. Connected at the intermediate positions 50 and 52 of the potentiometer resistors 46 and 48 are lines 54 and 56 respectively leading to the grids 58 and 60 of electronic amplifier tubes, generally designated 62 and 64 respectively of the aileron and rudder control subcircuits 28 and 30 respectively. The amplifier tubes 62 and 64 are provided with filaments 63 and 65 supplied with electric current from current sources 67 and 69 respectively, the positive terminals of which are connected by the lines 71 and 73 to the negative terminals of a storage battery or other current source 74 or 76. The opposite ends of the differential potentiometer resistances 46 and 48 are interconnected by lines 68 at the negative ends and 66 at the positive ends respectively, the polarities thereof being determined by lines 70 and 72 running thereto from the negative and positive terminals respectively of a direct current source, generally designated 78, such as a storage battery or direct current dynamo.

The aileron or rudder control subcircuits 28 and 30 are of similar make-up and arrangement, hence may be described simultaneously. Running from the plates 80 and 82 respectively of the electronic tubes 62 and 64 are lines 84 and 86 leading to one end each of arcuate resistors 88 and 90 respectively of automatic balancing potentiometers, generally designated 92 and 94 respectively. Lines 96 and 98 respectively run from the opposite ends of the resistors 88 and 90 to the lines 100 and 102 connecting the positive terminals of the direct current sources 74 and 76 to the field potentiometers 108 and 110 respectively at the positive ends of the resistors 112 and 114 respectively. Also connected by lines 116 and 118 respectively to the same ends of the resistors 112 and 114 are the positive terminals of direct current dynamos 120 and 122 respectively, the negative terminals of which are connected by lines 124 and 126 respectively to the opposite ends of the potentiometer resistors 112 and 114 respectively.

Sliders 128 and 130 on the resistors 112 and 114 of the potentiometers 108 and 110 are electrically connected to one end of each of the field windings 132 and 134 of servo motors 136 and 138 respectively, the opposite ends being connected to the automatically movable balancing sliders 140 and 142 mounted on arms 141 and 143 mechanically connected to and rotatable with the rotors 144 and 146 thereof energized from the direct current lines 148, 150 and 152, 154 respectively. The arms 141 and 143 are in turn pivotally connected to the aileron control rod 145 and rudder control rod 147 respectively.

The sliders 38 and 40 of the potentiometers 42 and 44 of the cross-control subcircuit 24 are connected to the variable ratio control subcircuit 26 by lines 156 and 158 leading to the lower sliders 157 and 159 of the resistors 160 and 162 respectively of adjuster potentiometers 164 and 166 respectively and thence by continuations of lines 156 and 158 to the opposite sliders 168 and 170 respectively of the resistor 172 of a control potentiometer 174. The upper slider 161 of the resistor 160 of the potentiometer 164 is connected by a line 176 to the lower or positive end of the resistor 172 of the potentiometer 174 and thence by a line 177 to the upper slider 163 of the potentiometer 166. The lower end of the resistor 172 is connected by a line 178 to the positive terminal of a direct current source 180, such as a storage battery, the negative terminal of which is connected by the line 182 to the upper or negative terminal of the resistor 172 of the potentiometer 174. The single outer sliders 184 and 186 of the potentiometers 164 and 166 are electrically connected by the lines 185 and 187 to the lines 71 and 73 respectively, and mechanically connected by links 188 and 190 respectively to bellcrank levers 192 and 194 pivotally mounted on brackets 196 and 198 of the aircraft's fuselage and mechanically interconnected by a common link or rod 200. The sliders 168 and 170 of the potentiometer 174, on the other hand, are connected mechanically by links 202 and 204 respectively to pivots 206 and 208 on a cross bar 210 which is keyed or otherwise drivingly connected to a shaft 212 journalled in a fuselage bracket 201.

The links 202 and 204 respectively carry arms 205 and 207 to which are pivotally connected links 209 and 211 operatively connected to the sliders 157, 161 and 159, 163 of the potentiometers 164 and 166 respectively. Keyed or otherwise drivingly mounted on the shaft 212 is a crank arm 216 to which is pivoted a link 218 running to the operating arm 220 of the conventional elevator 222 which is pivoted at 231 to the airplane empennage. A bevel gear 214 is keyed or otherwise drivingly connected to the shaft 212 and meshes with a bevel gear 213 keyed or otherwise drivingly secured to a tubular shaft 215. The tubular shaft 215 is journaled in a bracket 217 mounted on the aircraft fuselage and is connected to the control column 219 which, as usual, is swingable in a fore and aft direction. Journaled in the upper end of the control column 219 is a shaft 221 carrying a main control wheel 203 and a crank arm 223. Pivotally connected to the crank arm 223 is the upper end of a link 225, the lower end of which is pivotally connected to one arm of a bellcrank 227 pivotally mounted on a bracket 229 on the control column 219. The other arm of the bellcrank 227 operatively engages the rod 200 to reciprocate the latter in a manner similar to the bellcranks 192 and 194 described above.

The rod 200 passes loosely and slidably through the tubular shaft 215 and the lower end of the control column 219 mounted thereon, and across the end of the shaft 212. To avoid unduly complicating the showing of the parts in Figures 1, 4 and 10, the arms 205 and 207 on the rods 202 and 204 have been illustrated as directly connected to the slider-operating rods 209 and 211. In actual practice, of course, compensating links (not shown) would be installed between the arms 205 and 207 and the rods 209, 211, respectively to compensate for the arc of swing introduced by the cross bar 210. Slide guides would also be provided for the rods 209 and 211 and the sliders 168 and 170, the sliders 184 and 186, the sliders 128 and 130 and the sliders 38 and 40.

The modified yaw-responsive auxiliary control unit, generally designated 224, shown in Figure 2 provides automatic operation of the control member 22 in response to the varying position of a yaw indicator, such as a yaw vane 226 pivotally mounted on the rotor shaft 228 of a synchro-generator 230 supplied with alternating current through the lines 232 and 234 and mounted upon the fuselage 236 of a conventional airplane 238 (Figure 3) having a longitudinal axis 239. From the stator of the synchro-generator 230 the lines 240, 242 and 244 run to the stator of a synchro-motor 246, the rotor 248 of which is supplied with alternating current through the lines 250 and 252 and has a rotor shaft 254 operatively connected to the control member 22 for actuation thereof in response to the varying positions of the yaw indicator 226 relatively to the longitudinal axis 239.

The modified expansible link unit, generally designated 256 (Figure 4) provides, in effect, means for lengthening or shortening the connection between the elevator operating arm 220 and the cross bar 210, now supported on support 199 by pivot 197, in accordance with the influence of other factors, for example, the attitude of the airplane as indicated by the so-called angle of attack circuit shown in Figure 5, or by the speed of the airplane at high speeds as indicated by the so-called Mach number indicator control circuit shown in Figure 7. In the modified elevator expansible link unit 256, a link 257 pivoted at 206 to the cross bar 210 is provided at its opposite end with a pivotal connection 258 to an arm 260 keyed or otherwise drivingly connected to the rotor shaft 262 of a servo-motor 264 of which the stator 266 is connected as at 268 to a reciprocatory rod 270 reciprocably mounted in the bore 272 of a slide guide bearing bracket 274 and having a pivotal connection 276 to a rod 278. The rod 278 at its opposite end is pivotally connected at 280 to the operating arm 220 of the elevator 222. The servo-motor 264 is controlled as to the relationship between its rotor arm 260 and stator rod 270 in accordance with the action of an auxiliary circuit such as the above-mentioned auxiliary control circuits shown in Figures 5 and 7, as described below.

*Additional adjustment in response to angle of attack factor*

The modification shown in Figures 5 and 6 provides an auxiliary control circuit which alters the feedback from the setting of the elevator 222 by way of the pivoted bar 210 to the sliders 168 and 170 of the control potentiometer 174 of the resistance-coupled circuit 20 of Figure 1, in accordance with the angle of attack of the aircraft and is most effective at sub-sonic speeds. The angle-of-attack variation circuit 300 includes an angle of attack indicator, such as the vane 302 pivotally mounted as at 304 on the aircraft 238 (Figure 6) in such a manner as to swing upward or downward around a horizontal axis in accordance with the angle of attack of the aircraft 238. The angle of attack indicator 302 may be mounted in any convenient part of the aircraft, the location shown in Figure 6 being purely illustrative. Running from the pivot shaft 304 of the angle of attack indicator 302 is a line 306 connected to the negative terminal of a direct current source 308 which lights the filament 310 of an electronic amplifier tube 312.

From the positive terminal of the filament current supply source 308, the line 314 runs to the negative terminal of a direct current supply source 316, such as a storage battery. From the positive terminal of the direct current source 316, the line 318 runs to one end of the arcuate resistor 320 of a balancing potentiometer 322, the resistor 320, being non-linearly wound or otherwise arranged. From the opposite end of the resistor 320, the line 321 runs to the plate 323 of the amplifier tube 312 from the grid 325 of which the line 324 runs to the negative end of an arcuate resistor 326 of a potentiometer 328 engaged by a rotary or swinging slider 330 mounted on the shaft 304 and connected to the line 306. From the opposite end of the arcuate resistor 326, the line 332 runs to the positive terminal of a direct current source 334, such as a storage battery, from the negative terminal of which the line 336 runs to a junction with the line 324.

Engageable with the arcuate resistor 320 of the balancing potentiometer 322 is a swinging slider 338 (Figure 5) which is mounted on the rotor shaft 340 of a servo-motor 342 which replaces the servo-motor 264 of Figure 4 and which also carries an arm or crank 344 to which is pivotally connected a link 346 which replaces the link 257 of Figure 4. Connected to the swinging slider 338 is one end of the field winding 348 of the servo-motor 322, the opposite end being connected to a slider 350 engaging the resistor 352 of a potentiometer 354. One end of the resistor 352 is connected to the line 318 leading from the positive terminal of the direct current source 316 and also to a line 356 connected to the negative terminal of a direct current dynamo 358, the positive terminal of which is connected by the line 360 to the opposite end of the resistor 352. The servo-motor 342 is energized from the direct current lines 362 and 364.

The angle-of-attack variation circuit, when used in cooperation with the expansible link unit 256 of Figure 4, is connected therein by replacing the servo-motor 264 of Figure 4 with the servo-motor 342 of Figure 5. By this substitution, the arm 344, which is keyed or otherwise drivingly connected to the rotor shaft 340, replaces the arm 260 on the rotor shaft 262 and is similarly pivoted at 258 to the link 257, while the stator of the servo-motor 342 replaces the stator 266 by being connected to the reciprocating rod 270.

*Additional adjustment in response to Mach number variation*

The modification shows in Figures 7, 8 and 9 provides an auxiliary circuit, generally designated 370, which also alters the feed back from the setting of the elevator 222 of the airplane 238 from that which it would otherwise receive from the link 218 of the output of the resistance-coupled circuit of Figure 1, in accordance with the Mach number variation, and is most effective at high subsonic and supersonic speeds.

The Mach number variation circuit 370 includes a Mach number indicator, generally designated 372, mounted at any one of a number of locations on the airplane 238, as shown in Figure 9. The Mach number indicator 372 consists of a tubular casing 374 having end and side openings 376 and 378 in which are mounted respectively a hot junction total temperature thermocouple 380 and a hot junction stream of ambient temperature thermocouple 382. The thermocouples 380 and 382 are connected in an electronic bridge circuit, generally designated 383. The thermocouples 380 and 382 consist of paired dissimilar metal elements 384, 385 and 386, 387. The elements 385 and 386 meet at a so-called cold junction 388 whereas the elements 384 and 387 are connected to the grids 395 and 397 of electronic amplifier tubes 394 and 396 by the lines 399 and 392 respectively (Figure 7). From the cold junction 388, the line 398 leads to the negative terminal of a direct current source 400, such as a storage battery, from the positive terminal of which a line 402 runs to the negative terminal of the filament current supply source 404 from the negative and positive terminals of which lines 406 and 408 respectively run to the opposite ends of the filaments of the electronic tubes 394 and 396 respectively.

Running from the positive polarity filament current supply line 408 to the negative terminal of a direct current supply source 410 is a line 412, whereas the positive terminal of the direct current supply source 410 is connected to a slider 414 on a resistor 416 of a potentiometer 418. The opposite ends of the resistor 416 are connected by lines 420 and 422 respectively to lines 424 and 426 running from the plates 425 and 427 of the electronic tubes 394 and 396 to the opposite ends of the arcuately-arranged resistor 428, which in turn is engaged by a swinging slider 430 mounted on and drivingly connected to the rotor shaft 432 of an automatically-balancing potentiometer 434 supplied with direct current by direct current supply lines 436 and 438.

Also connected to the swinging slider 430 is one end of a field winding 440 of the servo-motor 442 of the balancing potentiometer 434, the opposite end of which is connected to a slider 444 engageable with the resistor 446 of a potentiometer 448. The opposite ends of the resistor 446 are connected by lines 450 and 452 to the positive and negative terminals respectively of a direct current dynamo 454. An operating arm 456 is keyed or otherwise drivingly connected to the rotor shaft 432, and an operating rod 458 is pivotally connected to the arm 456. The operating rod 458 replaces the link 257 in Figure 4.

*Operation*

In the operation of the resistance-coupled aerodynamic control circuit 20 of Figure 1, after the various circuits are energized, the control wheel 203 and the cross-control member 22 of the airplane must first be set at their neutral positions, namely their positions of zero deflection. These adjustments are made on the ground before taking off.

When the circuits have been energized, the plate current from the tube 62 passing through the potentiometer 88 induces a voltage across the line 96 and slider 140. This is opposed by the counteracting voltage from potentiometer 108 picked off between line 100 and slider 128. Accordingly, while an assistant forcibly holds one of the ailerons in neutral position, and the rod 145 and hence slider 140 consequently move into neutral positions substantially as shown in Figure 1, the operator adjusts the balancing voltage between the line 100 and slider 128 of the potentiometer 108 by adjusting the position of the slider 128 until there is substantially no current flowing through the field winding coil 132, so that the slider 140 of the balancing potentiometer 136 and the ailerons, for the time being, remain in their neutral or zero-deflection positions.

Similarly, while an assistant forcibly holds the rudder in its neutral position, and the rod 147 and slider 142 of the balancing potentiometer 138 consequently move into their neutral positions, the operator then adjusts the slider 130 of the potentiometer 110 in the rudder or yaw element control subcircuit 30 until there is also substantially no current flowing through the field winding coil 134 of the balancing potentiometer 138, whereupon the slider 142 thereof and the rudder remain, for the time being, in their neutral or zero deflection positions.

Although the control system 20 of Figure 1 is the primary control system which operates the aircraft throughout flight, to simplify the description of the operation, let it be assumed that the aircraft has taken off and is flying in a straight and level position—that is, not climbing or gliding, not turning or banking, and without any yaw. Let it now be assumed that the operator wishes to execute a coordinated turn to the right. To do so, it is unnecessary to use the foot pedals normally used to control the rudder, the compensatory action of the rudder being taken care of automatically by the system itself, in order to overcome the adverse yaw effect set up by the ailerons in banking or turning, as explained above in the description of turning or banking under conventional systems of control. Instead, he turns the control wheel 203 to the right or clockwise and thereby shifts the link 200 to the left, moving the sliders 184 and 186 of the potentiometers 164 and 166 simultaneously upward. The upward shift of the slider 184 selects or picks off an increased magnitude of negative voltage from the resistor 160 and applies it to the grid 58 of the amplifier tube 62 by way of line 185 from the filament 63, the slider 157, the line 156, slider 38, resistor 46 and line 54 to the grid 58. This voltage through the amplifier tube 62 modifies the current from the plate 80 and acts on the resistor 88 of the balancing potentiometer 92 to unbalance the balanced voltage already applied thereto by the current sources 74 and 120, decreasing the voltage across the resistor 88 and consequently decreasing the voltage drop between the line 96 and the slider 140 of the balancing potentiometer 92. Current consequently flows through the field winding 132 of the servo-motor 136 of the balancing potentiometer 92, swinging the slider 140 thereof to cause it to seek and reach a new position of balance, at the same time swinging the arm 141 to shift the aileron control rod 145 in a direction repositioning the ailerons by a deflection which is in proportion to the voltage change across the resistor 88 for a turn to the right.

Meanwhile, the upward shift of the slider 186 on the resistor 162 of the potentiometer 166 which accompanied the upward shift of the slider 184 on the resistor 160 of the potentiometer 164 just described, has also selected or picked off an increased magnitude of negative voltage from the resistor 162 of the potentiometer 166 and impressed this voltage upon the grid 60 of the amplifier tube 64 by way of line 187 from filament 65, slider 159, line 158, slider 40, resistor 48 and line 56 to grid 60. This voltage through the amplifier tube 64 modifies the current from plate 82 which is passed by line 86 to the resistor 90 of the balancing potentiometer 94, upsetting the balance of the voltages applied thereto by the current sources 76 and 122. The current flowing as a result of this unbalanced voltage through the field winding 134 of the servo-motor 138 swings the slider 142 and arm 143 in a direction seeking and reaching a new position of balance, at the same time shifting the rudder control rod 147 to apply a predetermined compensatory deflection to the rudder for overcoming the adverse yaw imparted to the airplane by the action of the ailerons, as explained above in connection with the description of the operation of conventional controls in conventional airplanes. In this manner, an automatically-coordinated turn is normally made in level flight and at a given speed, without requiring any attention to the rudder on the part of the operator of the aircraft and without the trial-and-error use of the foot pedals controlling the rudder. Non-level flight turns are similarly executed.

The control circuit 20 of Figure 1 is so constructed, arranged and adjusted for the particular airplane, that it will counteract the adverse yaw effect brought about by the action of the ailerons in performing a turn, thereby performing a so-called coordinated turn. A coordinated turn is defined herein as one wherein there is no yaw of the airplane throughout the turn or, in other words, that the yaw is maintained at zero. The yaw-responsive auxiliary control unit 224 applies a so-called cross-control to the rudder when, for any reason, the yaw is not maintained at zero during the turn being executed under control of the control circuit 20 of Figure 1. For example, in some airplanes, the lateral stability of the airplane is of such a nature that during a turn the outer wing which is lifting more than the inner wing, introduces a side slipping effect which can be corrected only by a so-called cross-control operation—that is, an operation of the rudder controls relatively to the aileron control which is opposite to the usual operation thereof in executing a given turn in a given direction. A similar yawing effect is introduced in a multi-engined plane if one engine is not performing properly so that the more powerful engine which is performing properly introduces a yawing couple.

The yaw-responsive auxiliary control circuit 224 shown in Figure 2 automatically applies a compensating rudder action to overcome yaw arising during a maneuvering turn. Let it be assumed that the airplane 238 has developed yaw during a maneuver, and that a consequent swing of the yaw indicator 226 away from the longitudinal axis 239 (Figure 3) has rotated the rotor shaft 228 of the synchro-generator 230. In consequence of the swing of the rotor shaft 228 of the synchro-generator 230, the rotor shaft 254 of the synchro-motor 246 swings through the reverse angle as the angle of swing of the yaw indicator 226, consequently swinging the cross-control member 22 through a reverse angle. This action through the links 34 and 36 moves the slider 38 of the potentiometer 42 in one direction and at the same time moves the slider 40 of the other potentiometer 44 in the opposite direction. As a consequence, the sliders 38 and 40 pick off voltages from their respective resistors 46 and 48 which, when combined with the voltages picked off by the sliders 184 and 186 from the resistors 160 and 162 of the potentiometers 164 and 166, alter the voltages impressed upon the grids 58 and 60 of the amplifier tubes 62 and 64 respectively. This action in turn applies modified currents to the resistors 88 and 90 of the balancing potentiometers 92 and 94, upsetting the balance of voltages previously existing therein, as explained above, and causing a current to flow through the field coils 132 and 134 of the servo-motors 136 and 138 respectively. This action again causes a swinging of the rotor shafts 144 and 146 of the servo-motors 136 and 138, consequently swinging the arms 141 and 143 and applying consequent correction to the aileron control rod 145 and rudder control rod 147 respectively. In this manner, as the aircraft develops a yawing action during a co-ordinated turn which is in excess of the yawing action overcome automatically by the control circuit 20 of Figure 1, this additional yawing effect is also automatically overcome by the yaw-responsive auxiliary control unit 224 of Figure 2.

Let it now be assumed that the aircraft has changed speed from that at which it was previously proceeding, thereby requiring a different attitude of the airplane and consequently a different setting of the elevator 222. This arises by reason of the fact that at a slower speed, the angle of attack of the airplane, namely the angle in the vertical plane between the airplane longitudinal axis and the direction of the wind, will be greater than at higher speeds, hence the elevator 222 will be tilted at a greater angle upward at the trailing edge thereof than it previously occupied in the level flight position of the airplane at the previous higher speed. The shifting of the elevator 222 and the consequent shifting of the control arm 220 and the link 218 at the slower speed consequently rotates the cross bar 210 in a counter-clockwise direction, thereby causing the link 202 to pull the slider 168 of the potentiometer 174 downward while the link 204 pushes the slider 170 of the same potentiometer upward, thereby setting in motion the variable ratio control circuit 26. The lowering of the slider 168 decreases the voltage across the potentiometer 164, hence a smaller voltage change occurs for a given motion of the slider 184 along the resistor 160 of the potentiometer 164, with a consequently less change in grid bias voltage impressed on the grid 58 of the amplifier tube 62 for a given movement of the slider 184. Hence there is less change in the amplified current passing through the resistor 88 of the balancing potentiometer 92, with the result that less motion of the aileron occurs at the lower speed for a given angular deflection of control wheel 203.

At the same time, the raising of the slider 170 along the resistor 172 of the potentiometer 174 increases the voltage applied across the resistor 162 of the potentiometer 166, hence increases the change in grid bias voltage impressed upon the grid 60 of the amplifier tube 64 for a given movement of slider 186, hence increases the current reaching the resistor 90 of the balancing potentiometer 94 for a given positioning of slider 186. The latter, in seeking a new position of balance, imparts a greater rotation to the rotor shaft 146 and arm 143 with a consequently greater motion of the rudder control rod 147 so that the rudder is given a greater deflection with a given angular deflection of control wheel 203. Thus at a slower speed, the control circuit 20 of Figure 1 automatically applies more rudder deflection and less aileron deflection for a given deflection of control wheel 203 in executing a given turn than at a lower speed.

The downward movement of slider 168 of potentiometer 174, which occurs as the elevator 222 is deflected, as described above, decreases the voltage impressed between sliders 157 and 161 of potentiometer 164. The sliders 157 and 161, being mounted on rod 209 which in turn is connected to rod 202 by the arm 205, also move downward simultaneously with the slider 168. The resistances per unit length of resistors 160 and 162 are selected in relation to the downward comparative movement of sliders 168 and sliders 157 and 161 so that the resultant voltage across sliders 157 and 184 remains constant as rod 202 and elevator 222 are deflected. Accordingly, movement of the elevator 222 will induce no change in grid bias voltage on amplifier tube 62 and hence will produce no aileron deflection. Yet the downward shifting of slider 168 and sliders 157 and 161 decreases the voltage per unit length impressed along the resistor 160 so that for a given vertical movement of slider 184, the voltage impressed across the grid 58 of the amplifier tube 62 will be less, in accordance with the above description. In a similar manner, slider 170 and sliders 159 and 163, the latter two attached by rod 211 and arm 207 to rod 204, compensate for the voltage change across slider 170 and line 178 so that deflection of the elevator 222 will cause no deflection of the rudder.

At a higher speed, for a given attitude of the airplane, the elevator deflection required for level flight is less than at a slower speed, consequently, the operation of the variable ratio control subcircuit 26 is reversed from that described immediately above. In executing a co-ordinated left turn rather than the right turn described above, the operator turns the control wheel 203 to the left or in a counterclockwise direction, shifting the control rod 200 to the right and reversing the corrections and other factors in the operation as described above for executing a coordinated right turn.

To arbitrarily yaw the aircraft, as for side slipping, for lateral trimming or for a crosswind landing, the operator now actuates the cross control subcircuit 24 manually by actuating his foot pedals 23 in order to shift the cross control bar 22. The manual actuation of the cross control circuit 24 introduces a counter voltage from the current source 78. This is accomplished when the operator rotates the cross-control bar 22, for example, clockwise to execute a left slip, raising the slider 38 of the potentiometer 42 and lowering the slider 40 of the potentiometer 44. Raising the slider 38 along its resistor 46 adds in a positive voltage to the negative grid bias voltage already impressed upon the grid 58 of the amplifier tube 62, thereby reducing the grid bias otherwise applied thereto in the manner explained above and consequently deflecting the ailerons in the same manner as described above in performing a normal right turn. The simultaneous lowering of the slider 40 along the resistor 48 of the potentiometer 44, however, adds in negative voltage to the negative grid bias already impressed upon the grid 60 of the amplifier tube 64, increasing the amplified voltage and consequently reversing the deflection of the rudder through the arm 143 and rudder control rod 147 so as to give either less rudder deflection or opposite rudder deflection from that previously applied.

In the operation of the angle of attack auxiliary circuit 300 of Figure 5, let it be assumed that the rod 346 representing the output of the servo-motor 342 replaces the elevator control rod 257, and that the airplane is proceeding, as before, in level flight at a relatively low speed. As the speed increases, the angle of attack of the aircraft 238 decreases (Figure 6) and with it a decrease in the position of the angle of attack indicator 302. The latter causes the slider 330 to move arcuately to the left along the arcuate resistor 326 of the potentiometer 328, decreasing the negative voltage or grid bias applied by the current source 334 to the grid 325 of the amplifier tube 312, decreasing the amplified voltage applied across the resistor 320 of the balancing potentiometer 322 and consequently causing a lower current to flow through the field winding 348 of the servo-motor 342 with a consequent recurrence of swing of the arm 344 as the slider 338 again seeks and finds a point of balance along the resistor 320. As a consequence, the lessened motion of the rod 346 applies a compensating motion to the cross bar 210 and a further consequent opposite sliding motion of the sliders 168 and 170 along the resistor 172 of the potentiometer 174.

The operation of the Mach number auxiliary control circuit 370 (Figures 7 to 9 inclusive) is controlled in response to the varying action of the Mach indicator 372 by the temperature differential existing between the thermocouples 380 and 382 in the tubular casing 374 as the air flows past the apertures 376 and 378 in which the thermocouples 380 and 382 are located. The thermocouples 380 and 382 are incorporated in the electronic bridge circuit 383 and the differing potentials generated by the thermocopules 380 and 382 at different speeds upset the balance of the bridge circuit 383 by the differing voltages applied to the grids 395 and 397 of the amplifier tubes 394 and 396. This in turn upsets the balance of the voltage in the resistor 428 of the balancing potentiometer 434, causing the slider 430 thereof and arm 456 to move until the slider 430 reaches a new point of balance in a manner similar to that described above, shifting the rod 458 and consequently shifting the cross bar 210 of Figure 1 so as to alter the settings of the sliders 168 and 170 of the potentiometer 174 to vary the voltages or grid biases impressed upon the grids 58 and 60 of the amplifier tubes 62 and 64 with a result as described above in connection with the operation of the sliders 168 and 170 in accordance with the setting of the elevator 222.

*Resistance-coupled electrical aerodynamic control system using multiple grid tubes*

The further modified control circuit, generally designated 460, shown in Figure 10 includes a modified cross-control subcircuit, generally designated 462, and a modified variable ratio control circuit, generally designated 464, replacing the cross control subcircuit 24 and variable ratio control subcircuit 26 shown in the upper central portion of Figure 1. As the connections and elements of the subcircuits 462 and 464 of Figure 10 are generally similar to those of the subcircuits 24 and 26 of Figure 1, the same reference numerals are used in Figure 10 to designate elements or lines similar to those of Figure 1, hence only the differences between these circuits require description.

In place of the single grid electronic amplifier tubes 62 and 64 of Figure 1, the modified circuit 460 of Figure 10 employs multiple grid tubes 466 and 468 respectively, specifically screen grid tubes. The plates 470 and 472 of the tubes 466 and 468, as before, are connected to the lines 84 and 86 running to the resistors of the balancing potentiometers 136 and 138 of Figure 1 (not shown in Figure 10) and the filaments 474 and 476 are similarly energized by the direct current sources 67 and 69, and also connected to the lines 71 and 73 running to the negative terminals of the direct current sources 74 and 76. Instead of the lines 54 and 56 of Figure 1 running from intermediate taps 50 and 52 on the resistors 46 and 48 of the potentiometers 42 and 44 to the single grids 58 and 60 of the single grid tubes 62 and 64, in Figure 10 the corrseponding lines 478 and 480 run from junctions with the line 66 on opposite sides of the latter's junction with the line 70 to the screen grids 482 and 484 respectively of the screen grid tubes 466 and 468.

Instead of the sliders 38 and 40 of the potentiometers 42 and 44 being connected to the sliders 168 and 170 of the potentiometer 174 by way of the lower sliders 157 and 159 of the resistors 160 and 162 of the potentiometers 164 and 166, as in Figure 1, in Figure 10, the corresponding lines 486 and 488 run from the sliders 38 and 40 of the potentiometers 42 and 44 to the sliders 184 and 186 of the potentiometers 164 and 166, and the lines 490 and 492 connected to the sliders 168 and 170 respectively of the potentiometer 174 run by way of the sliders 157 and 159 and the resistors 160 and 162 and the sliders 184 and 186 of the potentiometers 164 and 166 and the lines 185, 71 and 187, 73 respectively to the filaments 474 and 476 of the multiple or screen grid tubes 466 and 468, the grids 494 and 496 of which are connected by the lines 487 and 489 to the taps 491 and 493 on resistors 160 and 162. The sliders 38 and 40 of the potentiometers 42 and 44, as before, are connected mechanically by the links 34 and 36 to the pivoted cross-control member 22 of Figure 1 (not shown in Figure 10), whereas the sliders 184 and 186 of the potentiometers 164 and 166 are, as before, connected mechanically to the links 188 and 190 while the sliders 168 and 170 of the potentiometer 174 are, as before, connected mechanically to the links 202 and 204. The remainder of the electrical connections in Figure 10 are substantially the same as those in Figure 1.

The operation of the multiple-grid control circuit 460 of Figure 10 differs somewhat from that of the control circuit 20 of Figure 1. In Figure 1, the control circuit 20 impresses upon the single grid 58 of the amplifier tube 62 the combined voltages consisting of the voltage between sliders 38 and connection 50 of potentiometer 42 and the voltage between sliders 184 and 157 of potentiometer 164, in order to modify the plate current output of plate 80. In Figure 10, however, the modified control circuit 460 impresses each of these voltages separately across each of the two grids 482, 494 and 484, 496 of each multi-grid amplifier tube 466 and 468. The first-mentioned voltage, namely that from potentiometer 42, is impressed separately across the grid 482 of the amplifier tube 466 and its filament 474 by lines 478 and 486, and lines 185 and 71. The second-mentioned voltage, namely that from potentiometer 164, is impressed separately across grid 494 and filament 474 of amplifier tube 466 by lines 487, resistor 160 and lines 185 and 71. Correspondingly, the voltage from potentiometer 44 is impressed separately across the grid 484 of the amplifier tube 468 and its filament 476 by lines 480 and 488 and lines 187 and 73. Correspondingly, also, the voltage from potentiometer 166 is impressed separately across grid 496 and filament 476 of amplifier tube 468 by line 489, resistor 162 and lines 187 and 73.

The result is a variation in the output of the modified current reaching the lines 84 and 86 from the plates 470 and 472 of the amplifier tubes 466 and 468, with a similar unbalancing of the balancing potentiometers 92 and 94, and a consequent follow-up action of their respective sliders 140 and 142 to reach the new point of balance, meanwhile swinging their respective arms 141 and 143 and shifting the aileron control rod 145 and rudder control rod 147 in a manner similar to that described above in connection with the operation of the control circuit 20 of Figure 1.

Inductance-coupled electrical aerodynamic control system

Figure 11:
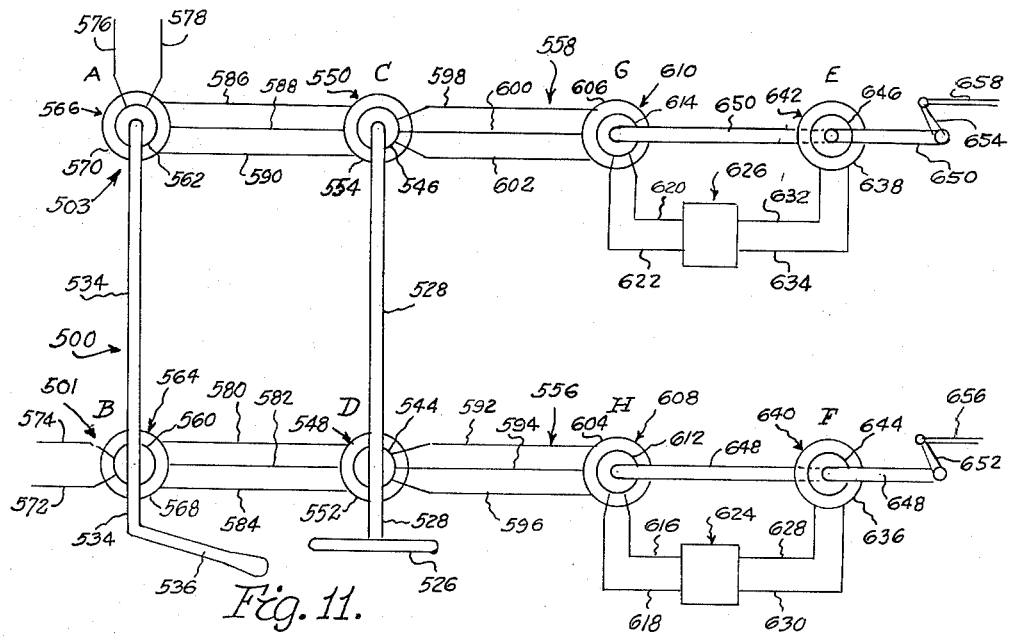
Figure 11 is a schematic diagram of a further modified electrical aerodynamic aircraft control system employing synchro-generators, synchro-receivers, and synchro-differentials.
Figure 12:
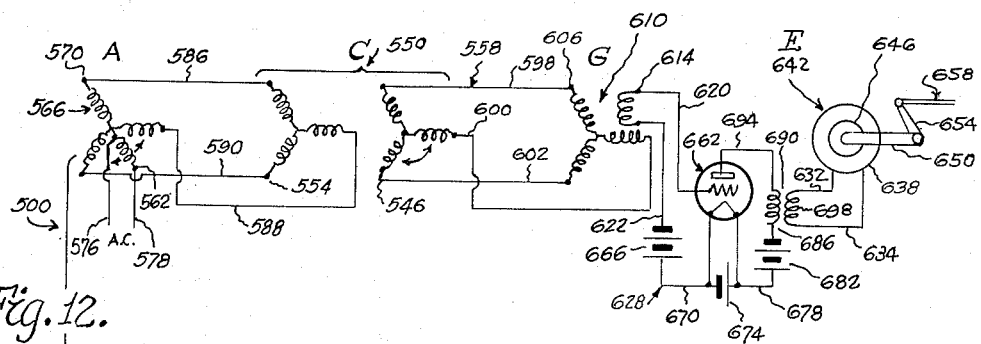
Figure 12 is an electrical circuit diagram of the arrangement shown in Figure 11.

The further modified aerodynamic control system, generally designated 500, is shown as a schematic diagram in Figure 11 and as an electrical circuit diagram in Figure 12, with its general arrangement in the aircraft shown in Figure 14 and with its control station shown in perspective in Figure 13. The system 500 is subdivided into a lower or aileron subsystem 501 and an upper or rudder control subsystem 503. The aircraft 502 is provided with the usual fuselage 504 and wings 506, the latter being provided with the usual roll control elements or ailerons 508 pivoted thereto at 509, whereas the former is provided with the usual yaw control element or rudder 510 pivoted at 511 to the airplane empennage 515, and pitch control element or elevator 512, the particular aircraft 502 having two elevators 512 pivoted at 513 to the airplane empennage 515. Mounted in the fuselage 504 of the aircraft 502 is a control supporting structure 514 (Figure 13) which may be of any suitable construction and which is here shown as consisting of a pair of upper and lower parallel shelves 516 and 518 interconnected by a vertical bridge member 520. The shelf 516 is arranged in a fore and aft direction, whereas the shelf 518 is arranged in a transverse direction.

Pivotally mounted on the upper shelf 516 is a rotary shaft 522 which is operatively connected to and in turn supports a manual control column 524 so that the shaft 522 rotates as the control column is swung back and forth in a fore-and-aft direction by the operator. The control column 524 carries a manual control wheel 526 mounted on a shaft 528 journaled in a head 530 at the upper end of the control column 524, the head 530 carrying a shelf 532. Also journaled in the head 530 is the shaft 534 of a cross control hand lever 536. Pivotally connected as at 538 to the lower end of the control column 524 below the pivotal mounting 522 thereof is the yoked forward end of an elevator or pitch control operating rod 540 which leads to and is pivotally connected to an arm 542 perpendicularly fixed to each of the elevators or pitch control elements 512 (one only being shown). The elevators or pitch control elements 512 are in turn pivoted at 513, as stated above.

It will be understood that the showing of the various rods and links of Figure 14 are purely diagrammatic in order to show functional connections, the actual connections differing in different types of aircraft. Larger aircraft, such as air transport planes and large bombers, would have no rods or mechanical cables running to the ailerons 508, rudder 510 and elevator 512 which instead would be operated by electric or hydraulic motors connected to the control system of the aircraft by electrical or hydraulic circuits.

The shaft 528 of the hand wheel 526 is adapted to control the ailerons 508 and, in coordination therewith, the rudder 510, as explained below. The shaft 528 is accordingly mechanically connected to the rotors 544 and 546 of differential synchro-generators 548 and 550 respectively having fields or stators 552 and 554 respectively, in aileron and rudder control subcircuits, generally designated 556 and 558 respectively. The shaft 534 of the cross control lever 536 is mechanically connected to the rotors 560 and 562 of synchro-generators 564 and 566 having stators 568 and 570 respectively. The synchro-generators 564 and 566 are supplied with alternating current from lines 572, 574, and 576, 578 respectively running to the respective windings of their respective rotors 560 and 562 from a common source of alternating current.

The stators or fields 568 and 570 of the synchro-generators 564 and 566 are connected electrically to the stators or fields 552 and 554 of the differential synchro-generators 548 and 550 by lines 580, 582, 584 and 586, 588, 590. It will be observed that the stator 568 is connected to the stator 552 in a reverse manner (Figure 12) to the connection of the stator 570 to the stator 554, for reasons explained below in connection with the operation of the invention. The synchro-generators 564 and 566 thus constitute on form of inductance coupling, the phase relationship between the stators and rotors thereof being determined by their mutual inductance set up by their relative angular positions.

The rotors 544 and 546 of the differential synchro-generators 548 and 550 are in turn connected by the lines 592, 594 and 596 and 598, 600 and 602 respectively to the stators 604 and 606 respectively of synchro control transformers 608 and 610 respectively having rotors 612 and 614 connected by lines 616, 618 and 620, 622 to electronic amplifiers, generally designated 624 and 626 respectively, the output lines 628, 630 and 632, 634 of which are connected to supply operating current to the servo-motors 640 and 642 respectively having fields or stators 636 and 638 and rotors 644 and 646 respectively. The rotors 612 and 614 of the synchro control transformers 608 and 610 are shown in Figure 11 as directly connected by rotary shafts 648 and 650 to the rotors 644 and 646 of the servo-motors 640 and 642, whereas in actual practice a geared connection therebetween may optionally be used. These shafts 648 and 650 carry crank arms 652 and 654 respectively, to the outer ends of which are pivotally connected aileron and rudder control rods 656 and 658 respectively. In the arrangement shown in Figures 11 and 12, the amplifiers 624 and 628 supply the entire operating current for the servo-motors 640 and 642 respectively, but in other conventional servo-motors, the amplifiers supply only field energization current, the rotor being supplied with current from an external source and the invention includes this alternative arrangement.

The amplifiers 624 and 626 are shown diagrammatically with single electronic amplifier tubes 660 and 662 respectively, it being of course understood that multi-tube amplifiers may be used if desired. The lines 616 and 621 from the rotors 612 and 614 of the synchro control transformers 608 and 610 (Figure 12) are connected to the grids of the amplifier tubes 660 and 662, whereas the lines 618 and 622 are connected by way of direct current sources 664 and 666, such as storage batteries to the lines 668 and 670 leading to the filaments of the amplifier tubes 660 and 662, which are supplied with heating current from current sources 672 and 674 respectively connected thereto. From the filaments of the amplifier tubes 660 and 662, the lines 676 and 678 run by way of direct current sources 680 and 682, such as storage batteries, to the primary windings 684 and 686 respectively of output transformers 688 and 690. The plates of the amplifier tubes 660 and 662 are connected by the lines 692 and 694 respectively to the opposite ends of the primary windings 684 and 686. From the secondary windings 696 and 698, the lines 628, 630 and 632, 634 run to the stators 636 and 638 of the servo-motors 640 and 642 respectively.

Operation

In the operation of the inductance-coupled electrical aerodynamic control system 500 of Figures 11 to 14 inclusive, let it also be assumed that the aircraft 502 has taken off and is flying in a straight and level position—that is, not climbing or gliding, not turning or banking, and without any yaw. Let it further be assumed that alternating current of suitable voltage and amperage is supplied through the lines 572, 574 and 576, 578 to the rotors 560 and 562 of the synchro-generators 564 and 566 respectively, which, while the cross-control lever 536 is held in a fixed position, generate fixed phase patterns which are transmitted to the stators 552 and 554 of the differential synchro-generators 548 and 550 through their respective connecting lines.

Let is now be assumed that the operator wishes to execute a coordinated turn to the right. To do so, the operator turns the control wheel 526 clockwise or to the right, rotating the shaft 528 and consequently rotating the rotors 544 and 546 of the differential synchro-generators 548 and 550 to the right, thereby rotating these rotors angularly relatively to their respective stators 552 and 554. This action shifts or rotates the phase pattern received from the synchro-generator 564 and transmits it through the lines 592, 594, 596 to the stator 604 of the synchro control transformer 608. The rotor 612 tends to seek and reach an angular position of equilibrium relatively to the angular phase pattern of its stator 604. If the torque loads upon the shaft 648 are sufficiently light, the rotor 612 will rotate to a position of equilibrium determined by the phase angular relationship existing in its stator 604.

Because of the rotation of the hand wheel 526, the current of rotated phase pattern received in the stator 604 of the synchro control transformer 608 has now rotated away from the previous position of equilibrium of its rotor 612. The rotor 612, because of the presence of high torque loads on shaft 648, is incapable of rotating to the new position of equilibrium corresponding to the new angular phase pattern set up in stator 604. Accordingly, the current induced in rotor 612 by its off-equilibrium position, is amplified by the amplifier 624 and transmitted to the stator 636 of servo-motor 640, the rotor 644 of which rotates shaft 648 and rotor 612 into a new position of equilibrium at which the rotor 612 ceases to transmit induced current to the amplifier 624, thereby halting the angular relation of rotor 644 of servo-motor 640. Meanwhile, the consequent rotation of the rotor 644 of the servo-motor 640 and the resulting rotation of the shaft 648 swings the arm 652 thereon to move the aileron control rod 656 and with it the ailerons 508 to their right-turn direction, namely with the right aileron 508 swung upward and the left aileron 508 swung downward.

While this is occurring and the ailerons are thus adjusted for their right turn or bank positions, the adverse yaw set up thereby in the aircraft 502 is counteracted automatically by the operation of the coordinated rudder control subcircuit 558 which is mechanically coupled by the shaft 528 to the aileron control subcircuit 556, the operation of which has just been described. The action of the rudder control subcircuit 558 is similar to that described for the aileron control subcircuit 556 in that the rotation of the rotor 546 of the differential synchro-generator 550 imparts rotation to shaft 650 and consequent motion to rudder control rod 658 in a manner similar to that described above in connection with the operation of the aileron control subcircuit 556, swinging the rudder 510 to the right.

To execute a left side slip with the wind coming from the right, the control system 500 operates the ailerons 508 in the same directions as for a coordinated right turn as described above but the operator now uses the cross control hand lever 536, swinging it counterclockwise to the left. This action, by reason of the reverse connection between the stators 568 and 552 of the synchro-generator 564 and differential synchro-generator 548, operates the ailerons in the same direction as for a coordinated right turn in response to the counterclockwise rotation of the rotor 560 of the synchro-generator 562. Simultaneously therewith, the counterclockwise rotation of the shaft 534 of the cross control hand lever 536 rotates the rotor 562 of the synchro-generator 566 counterclockwise, consequently the phase pattern induced in the stator 570 thereof is transmitted through the lines 586, 588, 590 in rotative phase to the stator 554 of the differential synchro-generator 550. Accordingly, as long as wheel 526 is held motionless at this time, this same phase rotation is induced in the rotor 546 and transmitted therefrom by the lines 598, 600 and 602 to the stator 606 of the synchro-control transformer 610.

The rotor 614 of the synchro-motor 610, however, because of the presence of high torque loads on shaft 650, is incapable of rotating to the new position of equilibrium corresponding to the new angular phase pattern set up in stator 606. Accordingly, the current induced in rotor 614 by its off-equilibrium position, is amplified by the amplifier 624 and transmitted to the stator 638 of servo-motor 642, the rotor 646 of which rotates shaft 650 and rotor 614 into a new position of equilibrium at which the rotor 614 ceases to transmit induced current to the amplifier 626, thereby halting the angular rotation of rotor 646 of servo-motor 642 and consequently halting the swinging to the right of the rudder 510, and leaving it in a position corresponding to the position of the cross-control lever 536.

*Resonance-responsive electrical aerodynamic control system*

The resonance-responsive aerodynamic control system, generally designated 700, shown in Figures 15 and 16, has some features in common with the inductance-coupled electrical aerodynamic control system 500 of Figures 11 to 14 inclusive. It differs therefrom, however, by being operated in response to the variation of the resonance properties of alternating current circuits to accomplish rotations of the rotors or two differential synchro-generators actuating the roll element (such as ailerons) and yaw element (such as ruder) in proportion to the shifting of the manual control member 526. The system 700 thereby replaces the direct mechanical linkage of Figure 11, which gives only a constant ratio of aileron deflection to rudder deflection upon actuation of main control member 526 with an electro-mechanical means for obtaining a variable ratio of aileron deflection to rudder deflection upon shifting of manual main control member 526.

In particular, the aerodynamic control system 700 of Figure 15 retains from the control system 500 of Figures 11 and 12 the manual main control member 526 and auxiliary cross control member 536 with their respective shafts 528 and 534. The auxiliary cross control member shaft 534, as in Figure 11, controls the positioning of the rotors 560 and 562 respectively and has similarly-numbered single-phase input and three-phase output alternating current lines to those of the system 500 of Figures 11 and 12 and similarly lead to the stators 552 and 554 of similar differential synchro-generators 548 and 550 respectively. The output lines 592, 594, 596 and 598, 600, 602 of the respective differential synchro-generators 548 and 550, lead to similar synchro control transformers 608 and 610, servo-motors 640 and 642, amplifiers 624 and 626 and their attendant shafts 648 and 650 leading respectively to the roll element or aileron control rod 656 and yaw element or rudder control rod 658. Accordingly, similar parts, lines and circuits in Figure 15 are designated with the same reference numerals as those of Figures 11 and 12.

From a comparison of the circuits shown in Figures 11 and 15, however, it will be observed that the central portion of Figure 15 differs considerably from that of Figure 11, this central portion being, for convenience, designated the resonance-responsive auxiliary circuit, generally designated 702. In the resonance-responsive system 700 of Figure 15, the shaft 528 of the main manual control member 526 no longer directly actuates the rotors 544 and 546 of the differential synchro-generators 548 and 550, as in Figure 11, but instead actuates the rotors or rotary plate assemblies of variable control condensers 708 and 710 connected in main resonance circuits 704 and 706 respectively and controlling in part the resonance charcteristics of transformer-coupled alternating current component circuits 712 and 714 respectively. Each of the main responance circuits 704 and 706, moreover, includes alternating current motive devices, generally designated 716 and 718, respectively operating upon the principle of the conventional alternating current ammeter with the output shafts 720 and 722 respectively mechanically connected to and operating the rotors 544 and 546 of the differential synchro-generators 548 and 550 respectively instead of carrying the usual needle or pointer registering with an actuate scale graduated in alternating current amperes.

The main resonance circuits 704 and 706 are generally similar in construction and arangement although usually differing in magnitude, and are similarly energized by the output lines 724 and 726 from the alternating current generator, generally designated 728, which may be either a conventional electronic oscillator or a conventional motor generator unit, the details of which are well known to electrical engineers and are beyond the scope of the present invention. The alternating current output line 726 leads through branches 730 and 732 respectively to one set of condenser plates of the variable condensers 708 and 710 respectively, the other set of which is connected by lines 734 and 736 containing inductances 738 and 740 to the alternating current motive devices 716 and 718 respectively. From the motive devices 716 and 718, lines 742 and 744 lead to primary subcircuits 746 and 748 which are transformer-coupled to inner or secondary subcircuits 750 and 752 respectively. The primary subcircuits 746 and 748 contain inductances 754 and 756, fixed condensers or capacitors 758 and 760, and the primary windings 762 and 764 of transformers 766 and 768. The latter may be cored either with air or with a magnetic-responsive material as the frequency or other conditions demand, and have secondary windings 770 and 772 disposed respectively in the secondary parallel subcircuits 750 and 752. At locations between the inductances 754, 756 and capacitors 758, 760 respectively, branch lines 774 and 776 lead to the output line 724 of the alternating current generator 728, thereby completing the energization of the primary subcircuits 746 and 748.

The secondary subcircuits 750 and 572, in addition to the secondary windings 770 and 772 of the transformers 766 and 768 (Figure 15) contain resistors 778 and 780 connected in series respectively with the secondary windings 770 and 772 in their respective subcircuits, each subcircuit being provided with three variable adjuster condensers or capacitors connected in parallel in each subcircuit. Thus, the subcircuit 750 contains three variable adjuster condensers or capacitors 782, 784 and 786, whereas the subcircuit 752 similarly contains three variable adjuster condensers or capacitors 788, 790 and 792. The rotary plates of the variable condensers or capacitors 782 and 788 are interconnected by a common rotary shaft 794 (Figure 15) which in turn is connected to the rotary shaft 522 (Figures 13 and 16) in the pitch element or elevator control mechanism so that the variable condensers 782 and 788 are adjusted and their capacities varied in accordance with the setting of the elevator or elevators 512 (Figure 14).

The rotary plates of the variable adjuster condensers or capacitors 784 and 790 are similarly interconnected by a common rotary shaft 796 which in turn is rotatably connected to an angle-of-attack sensitive vane similar to the vane 302 in Figure 5. In this manner, the variable adjuster condensers or capacitors 784 and 790 are adjusted in accordance with the variations in the angle of attack of the aircraft, as explained below in connection with the operation of the resonance-responsive aerodynamic control system 700.

Finally, the rotary plates of variable adjuster condensers or capacitors 786 and 792 are interconnected by a common rotary shaft 798 which in turn is connected to the output indicating element of a conventional Mach indicator or to the output shaft 432 of the servo-motor 442 of the Mach number indicator auxiliary control circuit 370 (Figure 7). In this manner, the variable condensers 786 and 792 are adjusted by the variations, at high speed, in the setting of the Mach indicator 372.

The mounting of the various elements of the resonance-responsive system 700 may be accomplished in any suitable way, such as, for example, the manual control unit 795 shown in Figure 16. The latter, as in Figure 13, has a control column 524 which, as explained in connection with Figures 13 and 14, is pivotally mounted for fore and aft swinging motion by the pilot or other operator. For convenience of illustration, the shelf 532 projecting transversely from the column 524 at its junction with the head 530 is shown as carrying various elements of the control system 700, such as the differential synchro-generators 548 and 550, and the electromotive devices 716 and 718 driving them. It will be self-evident however, that the synchro-generators 548 and 550 and the electromotive devices 716 and 718 may be placed at any convenient location in the aircraft, preferably close to the devices which adjust them.

These devices 718 and 716, as stated above, operate upon the principle and with the mechanism of a conventional alternating-current ammeter with the output shaft connected to the rotors of the differential synchro-generators 548 and 550 rather than carrying indicating needles or pointers. The shelf 532 (Figure 16) also carries the variable control condensers or capacitors 708 and 710 and their common rotary shaft 528 is journaled in the head 530 and carries the main manual control member 526 such as the hand wheel 526 in a manner similar to that of Figure 13. Similarly, also, the auxiliary cross control member 536 has its shaft 534 journaled in the head 530, which carries an upper shelf 797 which supports the synchro-generators 564 and 566. It will be understood, however, that the wheel 526 and lever 536 on the control column 524 are merely shown for purposes of illustration and convenience, and that the synchro-generators 564 and 566 and the control condensers 708 and 710 may as easily be rotated directly by knobs, hand wheels or the like.

The operation of the resonance-responsive aerodynamic control system 700 of Figures 15 and 16 depends upon the mutual interaction of the resonance circuits of the resonance-responsive auxiliary circuit 702 in the central portion of Figure 15. In principle, the operation of the ammeter-like electromotive devices 716 and 718 is controlled by the dissipation of electrical energy by the secondary subcircuits 750 and 752 from the primary circuits 746 and 748 to which the devices 716 and 718 are connected so as to receive alternating current from the alternating current generator 728 by way of the variable control condensers or capacitors 708 and 710 and inductances 738 and 740 in the main resonance circuits 704 and 706 respectively. Each of these main resonance circuits 704 and 706 possesses a frequency of natural resonance determined in part by the adjustment of the adjuster condensers 782 to 792 upon which the alternating current voltage is impressed from the alternating current generator 728. The secondary subcircuits 750 and 752 also possess resonance frequencies which dissipate the electrical energy from the primary subcircuits 746 and 748 through their transformer couplings 766 and 768 in a manner resembling that of a variable resistor in each of the primary subcircuits 746 and 748 but without the difficulty arising therein from the use of sliding contacts.

The behavior of the auxiliary circuit 702 in this respect is shown graphically by the family of curves in Figure 17 which expresses the current flowing in the main circuit 704 or 706 in terms of the ratio of the impressed or forced frequency $w$ of the voltage from the alternating current generator 728 to the natural resonance frequency $w$ of the circuit 704 or 706. The amount of dissipation of electrical energy from the primary subcircuits 746 and 748 by the secondary subcircuits 750 and 752 determines which of the curves of Figure 17 is applicable in the particular situation. Assuming a substantially constant frequency of the impressed alternating current voltage from the generator 728, a substantially constant natural resonance frequency occurs in the primary and secondary subcircuits 746, 748 and 750, 752 respectively of the resonance component circuits 712 and 714, the curves in Figure 17 showing the current $i_1$ flowing in the main resonance circuit 704 or 706 for several typical values of constant electrical energy dissipation $d$. This dissipation $d$ is varied by the variations in capacity in the secondary subcircuits 750 and 752 introduced by the variable condensers 782, 784, 786 or 788, 790, 792 respectively in accordance with the position of the elevator or pitch element 22, the setting of the Mach meter 372, or the setting of the angle of attack indicator 328 as determined by the positions, at the particular moment, of the elevator position indicating shaft 522 (Figure 16), the angle of attack output shaft 340 (Figure 5) or the Mach circuit output shaft 432 (Figure 7).

Thus, the settings of these variable condensers 782, 784, 786 or 788, 790, 792 determine the current through the resistors 778 or 780 in the secondary subcircuits 750 and 752 and consequently determine the dissipation of electrical energy by these resistors 778 and 780, this electrical energy being removed from the primary subcircuits 746 and 748 by the transformer-coupled relationship between the subcircuits 746, 750 and 748, 752 respectively. As previously stated, this dissipation of electrical energy through the transformers 766 and 768 is analogous to the dissipation of energy through a resistor placed directly in the primary subcircuit 746 or 748, such as, for example, in place of the transformer primary winding 762 or 764.

It will be further observed from Figure 17 that all curves representing the current flowing through the main resonance circuit 704 or 706 in relationship to the ratio $w/W$ pass through the common points P and Q regardless of the amounts of dissipation in the secondary subcircuits 750 or 752 and regardless of the settings of the variable condensers 782 to 792 in these secondary subcircuits 750 and 752.

In the operation of the resonance-responsive aerodynamic control system 700 of Figures 15 and 16, the control system 700 is so adjusted and trimmed that the ailerons or roll elements 508 and rudder or yaw element 510 are at zero deflection and that the manual control wheel 526 is in its neutral position when the variable condensers 708 and 710 in both the aileron circuit (lower half of Figure 15) and rudder circuit (upper half of Figure 15) are so set, and all other constants of the system are so selected that the particular ratio $w/W$ is obtained which will give the point P, for example, in the graphical relationship shown in Figure 17. With this arrangement, the current flowing through the main circuit 704 or 706 is substantially independent of the dissipation brought about by the secondary subcircuits 750 and 752 with their respective variable condensers 782 to 786 and 788 to 792 respectively. When the pilot or other operator now rotates the manual control wheel 526 and consequently varies the capacitances of the variable condensers 708 and 710 in Figure 15, he accordingly changes the natural frequency W. This in turn changes the ratio $w/W$, assuming that $w$, the forced frequency of the alternating current voltage emitted by the alternating current generator 728 remains constant.

Accordingly, the frequency ratio $w/W$ is no longer that corresponding to point P, for example, and the current flowing in the main circuit 704 or 706 is more (or less) than that for point P. This current is different from that required for trim of ailerons and rudder at zero deflection. Accordingly, the differences in currents in main circuits 704 and 706, through electromotive devices 716 and 718 respectively, rotate the rotor shafts 720 and 722 respectively, and thereby, as described above, actuate the ailerons and rudder respectively. The secondary effects of elevator setting, angle of attack or Mach indicator setting by automatically varying the dissipative effect $d$ (Figure 17) and hence the slope of the responsive current curve through the point P, for example, automatically determine the proportionate change in current for main circuits 704 and 706 for any particular change in frequency ratio $w/W$ obtained by manual adjustment of condensers 708 and 710. Accordingly, if, for example, the current curves slope vs. frequency ratio $w/W$ is higher, the current change will be higher and accordingly for a particular rotation of condensers 708 and 710 by shaft 528 the ailerons or rudder deflection will be higher.

By a correct selection of the adjusting condensers 782, 784, 786 or 788, 790, 792 and the manner of increase or decrease with the flight parameters which control them in the aileron and rudder circuits respectively, of Figure 15, the slopes of the curves of Figure 17 can be so adjusted that with rotation of the manual control wheel 526, the ratio of aileron deflection to rudder deflection can be adjusted to any value, either positive or negative, as is required by flight conditions. This occurs as a result of the resultant flow of current through the ammeter-like electromotive devices 716 and 718, the output shafts 720 and 722 of which control the differential synchro-generators 548 and 550 to vary the output to the aileron control rod 656 and rudder control rod 658 respectively, as explained above in connection with the operation of the control system 500 of Figures 11 and 12.

*Resonance-responsive pitch control system*

The resonance-responsive pitch control system, generally designated 800, shown in Figure 18 applies the principles of resonance variation of an alternating current circuit 802 to the positioning of the pitch control elements or elevators 512 (Figure 14) through the adjustment of their operating arms 542 by their operating rods 540. In Figure 18, the operating arms 542 and the elevators 512, however, are no longer controlled completely by manual shifting of the control column 524 of Figure 14, but their positions are also in part automatically adjusted in response to the action on the one hand of a conventional roll rate gyro 804 in a primary circuit 806 and on the other hand by a yaw rate gyro or attitude gyro 808 in a secondary circuit 810 which is transformer-coupled to the primary circuit 806 through a transformer 812 which may be either air-cored or iron-cored, as conditions may demand. The circuit 806 resembles either the aileron or rudder auxiliary circuit 701 or 703 of Figure 15 and its output current similarly actuates an electromotive device 814 incorporating the mechanism of an alternating current ammeter with the output shaft 815 connected to the rotor 816 of a differential synchro-generator 818 instead of carrying a needle or pointer registering with an ampere scale.

The circuit 802 is energized by an alternating current generator 820 similar to the alternating current generator 728 of Figure 15 described above and similarly connected by a line 822 to the electromotive device 814, the line 822 containing an inductance 824 and a variable condenser or capacitor 826, the rotary plates of which are connected to a shaft 828 rotated by the output shaft of the roll rate gyro 804. The remaining energization line 830 running to the electromotive device 814 from the alternating current generator 820 contains the primary subcircuit 832 which has two parallel branches 834 and 836, the former of which contains the inductance 838 and the latter the fixed condenser or capacitor 840 and in series therewith the primary winding 842 of the transformer 812. The secondary subcircuit 810, which is the energy dissipation circuit, contains the secondary winding 844 of the transformer 812, the resistor 846 and the variable condenser or capacitor 848 all arranged in series with one another. The rotary plates of the variable condenser 848 are connected to a shaft 850 which is rotated by the output shaft of the yaw rate gyro or roll attitude gyro 808.

The manual control lever 851 is connected to the rotor 853 of a synchro-generator 855 which is suitably mounted in any suitable support in the fuselage, the rotor 853 being energized by current input lines 857 and 859. The output lines 852, 854 and 856 of the synchro-generator stator 861 are connected to the stator 858 of the differential synchro-generator 818, the output lines 860, 862 and 964 from the rotor 816 of which lead to the stator 866 of a synchro control transformer 868, the rotor 870 of which is connected by the shaft 892 to the rotor 874 of a servo-motor 876. The servo-motor 876 is connected to the rotor 870 of the synchro control transformer 868 by lines 880 and 882 leading to the conventional amplifier 884 and by lines 886 and 888 leading therefrom. A link 890 at its rearward end is pivotally connected at 892 to a crank arm 894 constituting the mechanical output of the servo-motor 876, and at its other end is pivotally connected at 898 to the operating arm 542 of the elevator or pitch element 512 which is pivoted to the tail empennage at 513, as previously stated above.

In the operation of the resonance-responsive pitch control system 800 of Figure 18, to adjust the setting of the elevator or pitch element 512, the operator manually shifts the control lever 851, thereby turning the rotor 853 of the synchro-generator 855. The latter, in a manner similar to that described above in connection with the operation of the system 700 of Figure 15, operates through the differential synchro-generator 818, the synchro control transformer 868, the servo-motor 876 and the rod 890, deflects the elevator 512. Simultaneously with this, the circuit 802 of Figure 18 automatically superimposes upon the manually-adjusted elevator deflection, an additional elevator deflection over and above that imposed manually by the manual control lever 851. The magnitudes of the resistances, capacitances and inductances in the circuit 902 and the positioning of the roll rate gyro 804 and yaw rate or roll attitude gyro 808 are so selected that the frequency ratio $w/W$ will give point P of Figure 17 (which is explained above in connection with the operation of the aerodynamic control system 700 of Figures 15 and 16) at flight configurations when the rate of roll or bank is zero. The deflections of the roll rate gyro 804 away from zero will induce a change in the frequency ratio $w/W$ as described above in connection with Figures 15 and 17. The position of the yaw rate gyro (or roll attitude gyro) 808 will determine the slope of the curve through point P of Figure 17, as described above. Accordingly, in maneuvering flight this circuit 802 with the roll rate gyro 804 and yaw rate (or roll attitude) gyro 808 will automatically apply sufficient elevator deflection to supply the necessary pitch torque to the aircraft to modify automatically the change in the angular velocity of pitch needed in maneuvering flight. It will be understood that a conventional air speed indicator and/or angle of attack indicator or Mach meter can be added into the circuit of Figure 18 to operate variable condensers in parallel with the variable condenser 848 thereof.

*Modified resonance-responsive pitch control system*

The modified resonance-responsive pitch control system, generally designated 900, shown in Figure 19, like the system 800 of Figure 18, applies the principles of resonance variation of alternating current circuits to the positioning of the pitch control elements or elevators 512 through the adjustment of their operating arms 542 by their rods 896. In the pitch control system 800 of Figure 18, however, the rods 540 are controlled in part manually and mechanically by the manual shifting of the mechanically-operated control column 851 and in part automatically in response to the actions of a conventional roll rate gyro 804 in a primary circuit 806 and also in response to the action of a yaw rate gyro or attitude gyro 808 in a secondary circuit 810 which is transformer-coupled to the primary circuit 804 through the transformer 812.

In the modified resonance-responsive pitch control system 900 of Figure 19, the mechanical part of the adjustment of the pitch control elements or elevators 512 is controlled for the most part by purely electro-mechanical means and is given a manual adjustment or trim adjustment by another electro-mechanical control device set forth in more detail below. From a comparison of the modified pitch control system 900 of Figure 19 with the pitch control system 800 of Figure 18, it will be observed that the control system 900 of Figure 19 includes all of the control system 800 of Figure 18 with the exception of the manual control lever 851 and its servo-generator 855, instead having the synchro-generator 818 directly energized by the lines 901 and 903. With these exceptions, the system 900 differs from the system 800 of Figure 18 by interposing between the differential synchro-generator 818 and the synchro control transformer 868 of Figure 18 two additional differential synchro-generators, generally designated 902 and 904 respectively, the former having associated with it a supplemental elevator deflecting circuit 906 more fully described below, and the latter having connected to its rotor 908 a shaft 910 terminating in an adjustment knob 912 by means of which the pitch control elements or ailerons 512 may be "trimmed" manually by electrical means by turning the knob 912 as explained below.

Since the circuits and circuit elements to the left of the differential synchro-generator 902 are the same as those on the left-hand side of Figure 18, the same reference numerals have been applied thereto as in Figure 18 and the mode of operation thereof is also the same as that of the corresponding portion of Figure 18.

In the modified resonance-responsive pitch control system 900, the output lines 860, 862 and 864 are the input lines to the stator 914 of the differential synchro-generator 902, the rotor 916 of which is connected by the shaft 918 to an ammeter motive unit 920 similar to the ammeter motive unit 814 and like it an electro-motive device incorporating the mechanism of an alternating current ammeter, the output shaft 918 of which is connected to the rotor 916 of the differential synchro-generator 902 instead of carrying a needle or pointer registering with an ampere scale. The automatic operating circuit 906 connected to the ammeter motive unit 920 is described subsequently below. The rotor 916 of the differential synchro-generator 902 is connected by the lines 922, 924, and 926 to the stator 928 of the differential synchro-generator 904, the rotor 908 of which is connected by the lines 930, 932 and 934 to the stator 936 of the synchro control transformer 938 corresponding to the synchro control transformer 868 of the system 800 of Figure 18.

The rotor 940 of the synchro control transformer 938 is mechanically connected by a shaft 942 to the rotor 944 of the servo-motor 946 corresponding to the servo-motor 876 of Figure 18, the stator 954 carrying a crank arm 948 which is pivotally connected to the rod 950 slidably mounted in the slide bearing 952 and pivotally connected at its other end to the rod 540 which, as in Figure 18, is pivotally connected to the arm 544 upon each one of the pitch control elements or elevators 512. The slide bearing 952 is secured to and mounted upon the airplane fuselage 504 as in Figure 18. The stator 954 of the servo-motor 946 is connected by lines 956 and 958 to a conventional amplifier 960 similar to the amplifier 884 of Figure 18 and similarly connected on its opposite side by lines 962 and 964 to the rotor 940 of the synchro control transformer 938.

The automatic operating circuit 906 for the ammeter or electro-motive unit 920 (Figure 19) is also similar to the circuit for the similar electromotive unit 814 at the left-hand side of Figure 18, except that the roll rate gyro 804 and yaw rate gyro 808 are replaced by a conventional angle of roll indicator 966 and a conventional air speed indicator 968 connected by shafts 970 and 972 respectively to the rotary plates of variable condensers or capacitors 974 and 976 respectively. The circuit 906 is sub-divided into a primary circuit 978 and a secondary circuit 980 containing the variable capacitors 974 and 976 respectively and transformer-coupled to one another through a transformer 982 which may be either air-cored or iron-cored, as conditions may demand, an iron-cored transformer being shown for purposes of illustration.

The primary circuit 978 is energized by an alternating current generator 984 similar to the alternating current generators 820 of Figure 18 and 728 of Figure 15 and similarly connected by a line 986 running to one terminal of the electro-motive or ammeter-motive device 920. The line 986 contains the variable capacitor 974 and an inductance 987, both connected in series therewith. The remaining energization line 988 running to the electro-motive or ammeter-motive device 920 from the alternating current generator 984 contains a primary subcircuit 990 which has two parallel branches 992 and 994, the former of which contains an inductance 996 and the latter the fixed condenser or capacitor 998 and the primary winding 100 of the transformer 982 in series with one another. The secondary subcircuit 980, which is an energy-dissipation circuit, contains the secondary winding 1002 of the transformer 982, the resistor 1004 and the variable condenser or variable capacitor 976 all arranged in series with one another. As stated before, the shaft 970 of the variable capacitor 974 is connected to and rotated by the conventional angle of roll indicator 966, whereas the shaft 972 of the variable capacitor 976 is connected to and rotated by the conventional air speed indicator 968.

In the operation of the resonance-responsive pitch control system 900 of Figure 19, the alternating current circuit 802 at the left-hand end of Figure 19 operates in the same manner as the corresponding circuit 802 at the left-hand end of Figure 18, in response to the actions of the roll rate gyro 804 in the primary circuit 806 and of the yaw rate or attitude gyro 808 in the secondary circuit 810 thereof. This results in the automatic addition of the extra deflection to the elevators 512 needed to supply the pitch torque to the aircraft to change the angular velocity of pitch during maneuvering involving rates of rolling. The circuit portion and components of Figure 19 to the right of the manual control member 912 and shaft 910 also operate in a similar manner to the circuit portion and components in the right-hand half of Figure 18 in that the operator by rotating the knob 912 of Figure 19 (instead of the control lever 851 of Figure 18) applies manually-controlled deflection to the elevators 512.

The supplemental elevator-deflecting circuit 906 and its components in the lower central portion of Figure 19 below the electromotive device 920 automatically impress additional deflection upon the elevator 512 in response to the control exerted by the angle of roll indicator 966 upon the variable condenser 974 in the primary circuit 978 and by the air speed indicator 968 upon the variable condenser 976 in the secondary circuit 980. This action automatically compensates for the back pressure required in any steady state turn of the aircraft, so that the vertical component of the lift will be maintained in order either that the altitude of the aircraft will be maintained constant or that the rate of change of altitude of the aircraft will be maintained constant.

To accomplish this, the current in the supplemental elevator-deflecting circuit 906 is determined as described above in connection wtih the description of the operation of the circuit 802 of Figure 18 by the positioning of the angle of roll indicator 966 and of the air speed indicator 968 through the variable condensers 974 and 976. These are set, and the other circuit parameters are so selected that the frequency ratio $w/W$ described above in connection with the Figures 15 and 17 gives point P of Figure 17 (which is explained above in connection with the operation of the aerodynamic control system 700 of Figures 15 and 17) when the bank angle of the aircraft is zero at a selected air speed. As the air speed is varied relatively to this selected air speed, the current response of the circuit 906 changes with variation of dissipation $d$, as described above in connection with Figure 17.

Consequently, as the angle of roll indicator 966 is deflected during a rolled condition of the aircraft, the frequency ratio $w/W$ is modified from whence additional deflection is added to the elevators 512 of the aircraft in accordance with the amount of roll present and the air speed attained.

It will be understood that in place of the angle of roll indicator 966 of Figure 19, there may be substituted a conventional yaw rate indicator similar to the yaw rate indicator 808 of Figure 18, to give approximately the same result.

In the foregoing specification, the details of construction and operation of the synchro-motors, synchro control transformers, synchro-generators and differential synchro-generators have been omitted because these devices are conventional and their details are well-known to electrical engineers skilled in servo systems and hence are beyond the scope of the present application. A description of the details of construction, wiring and operation of such servo devices is given, for example, in the well-known book "Servomechanism Fundamentals" by Lauer, Lesnick and Matson published by McGraw-Hill Book Co., New York, First Edition 1947, following page 26 therein.

Moreover, since in the systems of this invention the synchro-motors, synchro-generators, differential synchro-generators, synchro control transformers and servo motors, in circuits where direct drive servo-motors are used, are deflected or rotated less than one complete revolution, the slip rings and contact brushes usually used therein for connecting the rotor winding to the outside frame are preferably replaced with flexible conductors, thereby eliminating the defects of slip rings and brushes.

It will be understood that the synchro control transformers 608 and 610 of Figures 11 and 15, 868 of Figure 18 and 938 of Figure 19 may be replaced by synchro motors, the rotors of which are subjected to torque when the stators are energized, and that the rotor shafts thereof can be connected to control valves (not shown) which in turn control the actuation of hydraulic servomotors rather than the electric servo-motors shown in the drawings.

It will be further evident from the description of the construction and operation of the aerodynamic control system 700 of Figure 15 that in the central circuit 702 thereof only one pair or set of the variable capacitors 782, 788 or 784, 790 or 786, 792 with its accompanying actuator 522, 302 or 442 is needed for completing the circuit and effecting complete operation, the other two actuators being operable supplementally thereto.

In conclusion, the invention, summarized, accomplishes the following general advantages:

First, it simplifies the handling of the aircraft by the pilot.

Second, it renders possible the utilization of simpler and less delicate manual or automatic means of control which are nevertheless fully reliable, dependable and rugged, so as to reduce the cost and complexity of the components previously used in aerodynamic control systems for aircraft.

Third, it enables the replacement of the mechanical aerodynamic control system by a practical electrical aerodynamic control system according to the invention, thereby simplifying aircraft structural and mechanical design, since it dispenses almost entirely with the necessity of running motion-transmitting rods around various structural or mechanical obstacles by means of levers, gearing, cables and the like, since the invention instead provides wires or other electrical conductors which can be easily strung around such obstacles without boring or otherwise altering these obstacles or relocating them as is frequently necessary in present aircraft design.

What I claim is:

1. An electrical aerodynamic control system for an aircraft having movable roll, yaw and pitch elements thereon, said system comprising a pilot-regulated pitch control member, a pilot-regulated roll-and-yaw control member, means connecting said pitch control member to the pitch element for deflecting the pitch element upon actuation of the pitch control member, an electrically-actuated roll element deflector operatively connected to the roll element for shifting the roll element, an electrically-actuated yaw element deflector operatively connected to the yaw element for shifting the yaw element, an electrical coordinating circuit operatively connecting said roll element deflector to said yaw element deflector and controlledly connected to said roll-and-yaw control member, said coordinating circuit being responsive to the shifting of said roll-and-yaw control member to deflect said roll and yaw elements in a predetermined ratio of deflection of said yaw element, to said roll element, and a roll-and-yaw deflection ratio varying device responsive to the alteration of the deflection of said pitch element by said pitch control member to automatically alter said deflection ratio of said yaw element to said roll element.

2. An electrical aerodynamic control system for an aircraft, according to claim 1, wherein said coordinating circuit is constructed and arranged to increase the ratio of deflection of the yaw element to the deflection of the roll element in response to increasing deflection of the pitch element corresponding to decreasing air speed of the aircraft.

3. An electrical aerodynamic control system for an aircraft, according to claim 2, wherein the roll and yaw element deflectors include voltage-sensitive servo-motor devices and wherein said coordinating circuit includes means for automatically altering the voltages supplied to said devices in accordance with said ratio.

4. An electrical aerodynamic control system for an aircraft, according to claim 1, wherein cross-control means is additionally provided for manually varying said ratio for cross-control operation of said roll and yaw elements.

5. An electrical aerodynamic control system for an aircraft according to claim 3, wherein said voltage-altering means includes a potentiometer having voltage pickoff elements thereon operatively connected to and selectively actuated by said pitch element deflecting means.

6. An electrical aerodynamic control system for an aircraft, according to claim 1, wherein the control system also includes a yaw indicator and means responsive to the deflection of said yaw indicator for automatically varying said ratio.

7. An electrical aerodynamic control system for an aircraft, according to claim 6, wherein the yaw indicator has a vane with a rotary vane shaft, and wherein the deflection-responsive means thereof includes a synchro-generator operatively connected to said vane shaft, a synchro-motor electrically and operatively connected to said synchro-generator, and an adjusting mechanism mechanically connecting said synchro-motor to said roll and yaw element deflectors.

8. An electrical aerodynamic control system for an aircraft, according to claim 6, wherein the roll and yaw element deflectors include voltage-sensitive servo-motor devices and wherein said coordinating circuit includes means responsive to the deflection of the yaw indicator for varying the setting of said variable ratio adjusting device.

9. An electrical aerodynamic control system for an aircraft, according to claim 1, wherein said connecting means includes an electrically-operated motion-extending device interposed between said control member and said pitch element and wherein said system includes an aircraft attitude-sensitive instrument operatively connected to said motion-extending device for actuating said motion-extending device automatically in response to the shifting of said attitude-sensitive instrument.

10. An electrical aerodynamic control system for an aircraft, according to claim 1, wherein said connecting means includes an electrically-operated motion-extending device interposed between said control member and said pitch element and wherein said system includes an aircraft Mach-number-sensitive instrument operatively connected to said motion-extending device for actuating said motion-extending device automatically in response to the shifting of said Mach-number-sensitive instrument.

11. An electrical aerodynamic control system for an aircraft, according to claim 1, wherein said coordinating circuit includes a multiple-grid electronic tube electrically connected to each deflector.

12. An electrical aerodynamic control system for an aircraft, according to claim 1, wherein the roll and yaw element deflectors include electrical servo-motors connected thereto and wherein said deflectors also include synchro-generators electrically connected to said servo-motors and wherein said coordinating circuit includes coupled differential synchro-generators electrically connected to their respective synchro-generators and mechanically coupled to said control member.

13. An electrical aerodynamic control system for an aircraft, according to claim 12, wherein the system includes a pilot-regulated cross-control member and also includes cross-control synchro-generators electrically connected to said differential synchro-generators and mechanically coupled to said cross-control member.

14. An electrical aerodynamic control system for an aircraft, according to claim 1, wherein the roll and yaw element deflectors include electrical servo-motors connected thereto and wherein said deflectors also include synchro-generators electrically connected to said servo-motors and wherein said coordinating circuit includes differential synchro-generators electrically connected to their respective synchro-generators and having electrical coupling to said control member, said electrical coupling including an alternating current source, an alternating current ammeter electromotive device connected to each differential synchro-generator, a main inductance-and-capacity circuit connected in circuit with each electromotive device and with said current source and including a variable capacitor operatively connected to said control member, an auxiliary inductance-and-capacity circuit also connected in circuit with each electromotive device and with said current source, and an auxiliary energy-dissipation circuit disposed in inductively-coupled relationship with each auxiliary inductance-and-capacity circuit.

15. An electrical aerodynamic control system for an aircraft, according to claim 14, wherein each auxiliary energy-dissipation circuit includes a variable capacitor.

16. An electrical aerodynamic control system for an aircraft, according to claim 15, wherein each auxiliary energy-dissipation circuit also includes a resistor connected in series with its respective variable capacitor.

17. An electrical aerodynamic control system for an aircraft, according to claim 15, wherein each of the variable capacitors in each auxiliary energy-dissipating circuit is operatively connected to said pitch element deflecting means.

18. An electrical aerodynamic control system for an aircraft, according to claim 15, wherein said system also includes an angle-of-attack-responsive instrument operatively connected to said variable capacitors in said auxiliary energy-dissipation circuit.

19. An electrical aerodynamic control system for an aircraft, according to claim 15, wherein said system also includes a Mach-number-responsive instrument operatively connected to said variable capacitors in said auxiliary energy-dissipation circuit.

20. An electrical aerodynamic control system for an aircraft, according to claim 1, wherein the pitch element deflecting means includes an electrical servo-motor operatively connected to the pitch element, a synchro-generator electrically connected to said servo-motor, a differential synchro-generator electrically connected to said synchro-generator, an alternating current source, an alternating current ammeter electromotive device operatively connected to said differential synchro-generator, a main inductance-and-capacity circuit connected in circuit with said electromotive device and with said current source and including a variable capacitor, a roll-rate-responsive instrument operatively connected to said variable capacitor, an auxiliary inductance-and-capacity circuit also connected in circuit with said electromotive device and with said current source, an auxiliary energy-dissipation circuit disposed in inductively-coupled relationship with said auxiliary inductance-and-capacity circuit, and a yaw rate-responsive instrument connected in energy-dissipating-controlling relationship with said energy-dissipating circuit.

21. An electrical aerodynamic control system for an aircraft, according to claim 20, wherein an additional differential synchro-generator is operatively connected between said previously-mentioned differential synchro-generator and said first-mentioned synchro-generator and wherein there is provided an additional alternating-current-source, an additional alternating current electromotive device operatively connected to said additional differential synchro-generator, an additional main inductance-and-capacity circuit connected in circuit with said additional electromotive device and with said additional current source and including an additional main variable capacitor, an angle-of-roll indicator operatively connected to said additional main variable capacitor, an additional auxiliary inductance-and-capacity circuit also connected in circuit with said additional electromotive device and with said additional current source, an additional auxiliary energy-dissipation circuit disposed in inductively-coupled relationship with said additional auxiliary inductance-and-capacity circuit, and an air-speed indicator connected in energy-dissipating-controlling relationship with said additional energy-dissipating circuit.

References Cited in the file of this patent
UNITED STATES PATENTS

| | | |
|---|---|---|
| 2,442,289 | Garehime | May 25, 1948 |
| 2,478,033 | Weick | Aug. 2, 1949 |
| 2,601,458 | Robert | June 24, 1952 |
| 2,781,182 | Ross | Feb. 12, 1957 |